United States Patent
Oya et al.

(10) Patent No.: US 9,712,780 B2
(45) Date of Patent: Jul. 18, 2017

(54) DISPLAY DEVICE ATTACHMENT FITTING AND DISPLAY DEVICE ATTACHMENT JIG

(71) Applicant: Panasonic Corporation, Kadoma-shi, Osaka (JP)

(72) Inventors: Tomoyuki Oya, Osaka (JP); Jinichi Iimura, Chiba (JP)

(73) Assignee: PANASONIC CORPORATION, Osaka (JP)

( * ) Notice: Subject to any disclaimer, the term of this patent is extended or adjusted under 35 U.S.C. 154(b) by 118 days.

(21) Appl. No.: 14/670,439

(22) Filed: Mar. 27, 2015

(65) Prior Publication Data

US 2015/0282618 A1 Oct. 8, 2015

(30) Foreign Application Priority Data

Apr. 4, 2014 (JP) ................... 2014-077951

(51) Int. Cl.
| | |
|---|---|
| *A47B 97/00* | (2006.01) |
| *F16B 1/00* | (2006.01) |
| *F16M 13/02* | (2006.01) |
| *H04N 5/645* | (2006.01) |
| *H04N 5/655* | (2006.01) |
| *F16M 11/04* | (2006.01) |
| *F16M 11/10* | (2006.01) |

(Continued)

(52) U.S. Cl.
CPC ........... *H04N 5/645* (2013.01); *F16M 11/041* (2013.01); *F16M 11/045* (2013.01); *F16M 11/046* (2013.01); *F16M 11/10* (2013.01); *F16M 11/18* (2013.01); *F16M 11/2092* (2013.01); *F16M 13/02* (2013.01); *F16B 2001/0035* (2013.01); *G09F 9/3026* (2013.01)

(58) Field of Classification Search
CPC .... H04N 5/645; F16M 11/041; F16M 11/045; F16M 11/10; F16M 11/18; F16M 11/2092; F16M 11/046; G09F 9/3026
See application file for complete search history.

(56) References Cited

U.S. PATENT DOCUMENTS 5,995,179 A * 11/1999 Tamura .................. G09F 9/3026
   349/58
6,314,669 B1 * 11/2001 Tucker ...................... G09F 9/33
   340/815.45

(Continued)

FOREIGN PATENT DOCUMENTS

| JP | 2002-072898 A | 3/2002 |
|---|---|---|
| JP | 2005-338531 A | 12/2005 |

(Continued)

*Primary Examiner* — Stanton L Krycinski
(74) *Attorney, Agent, or Firm* — Shinjyu Global IP

(57) ABSTRACT

An attachment fitting 12 comprises a frame body 12*a*, a fitting component 12*b*, and fixing bolts 17. The frame body 12*a* is externally the same size as a display device 11, and is attached to a wall surface 15, and has stiffness property enough to support the weight of the display device 11. The fitting component 12*b* is provided to the frame body 12*a* on the side where the display device 11 is attached, and supports the rear face 11*b* side of the display device 11. The fixing bolts 17 are provided to the side faces of the frame bodies 12*a*, and fix the frame bodies 12*a* to each other in a state of being in contact with the side faces of the frame bodies 12*a* included in attachment fittings 12 of display devices 11 attached at adjacent positions.

10 Claims, 24 Drawing Sheets

(51) Int. Cl.
*F16M 11/18* (2006.01)
*F16M 11/20* (2006.01)
*G09F 9/302* (2006.01)

(56) References Cited

U.S. PATENT DOCUMENTS

| | | | | |
|---|---|---|---|---|
| 6,335,829 | B1* | 1/2002 | Van De Voorde | H04N 9/3147 348/E5.144 |
| 6,634,124 | B1* | 10/2003 | Bierschbach | G09F 9/3026 40/452 |
| 6,741,222 | B1* | 5/2004 | Tucker | G09F 9/33 345/1.1 |
| 6,926,375 | B2* | 8/2005 | Nagamine | G09F 9/00 312/111 |
| 7,071,894 | B1* | 7/2006 | Thielemans | G06F 3/1446 345/1.1 |
| 7,142,181 | B2* | 11/2006 | Wang | G09F 9/33 248/917 |
| 7,503,721 | B2* | 3/2009 | Kuratomi | G09F 9/33 312/111 |
| 7,682,043 | B2* | 3/2010 | Malstrom | G09F 9/33 362/147 |
| 7,774,968 | B2* | 8/2010 | Nearman | G09F 9/30 292/240 |
| 7,926,213 | B1* | 4/2011 | Kludt | F16B 2/12 40/605 |
| 8,136,277 | B2* | 3/2012 | Patterson | G09F 9/33 362/147 |
| 8,197,088 | B2* | 6/2012 | Patterson | G06F 3/1446 362/249.02 |
| 8,369,103 | B2* | 2/2013 | Mitsuhashi | F16M 13/02 248/917 |
| 8,384,616 | B2* | 2/2013 | Elliott | G09F 9/33 345/1.1 |
| 8,537,302 | B2* | 9/2013 | Dunn | G02F 1/133603 349/58 |
| 8,599,104 | B2* | 12/2013 | Gardner | F21S 2/005 345/1.1 |
| 8,746,639 | B2* | 6/2014 | Nguyen | F16M 11/10 248/205.1 |
| 8,833,713 | B2 | 9/2014 | Kitaguchi | |
| 8,944,393 | B2* | 2/2015 | Mitsuhashi | G09F 7/18 248/220.22 |
| 2002/0027533 | A1 | 3/2002 | Shishida et al. | |
| 2003/0217495 | A1* | 11/2003 | Nagamine | G09F 9/00 40/605 |
| 2007/0000849 | A1* | 1/2007 | Lutz | G09F 9/3026 211/26 |
| 2008/0141572 | A1* | 6/2008 | Tomich | G09F 9/30 40/605 |
| 2011/0101185 | A1 | 5/2011 | Kitaguchi | |
| 2012/0062540 | A1* | 3/2012 | Quadri | G09F 9/3026 345/211 |

FOREIGN PATENT DOCUMENTS

| | | |
|---|---|---|
| JP | 2007-219194 A | 8/2007 |
| JP | 2009-186539 A | 8/2009 |
| JP | 2010-266752 A | 11/2010 |
| JP | 4594553 B2 | 12/2010 |
| JP | 2011-75757 A | 4/2011 |

* cited by examiner

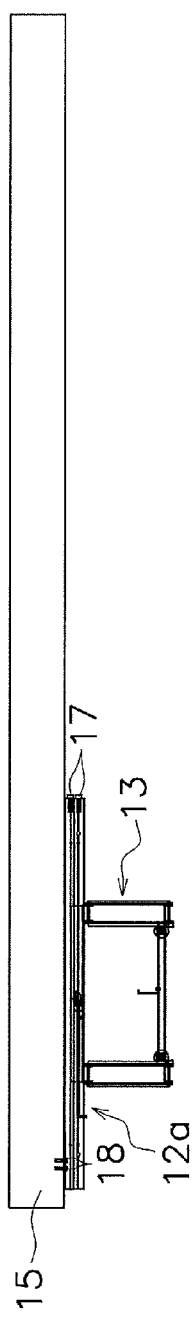
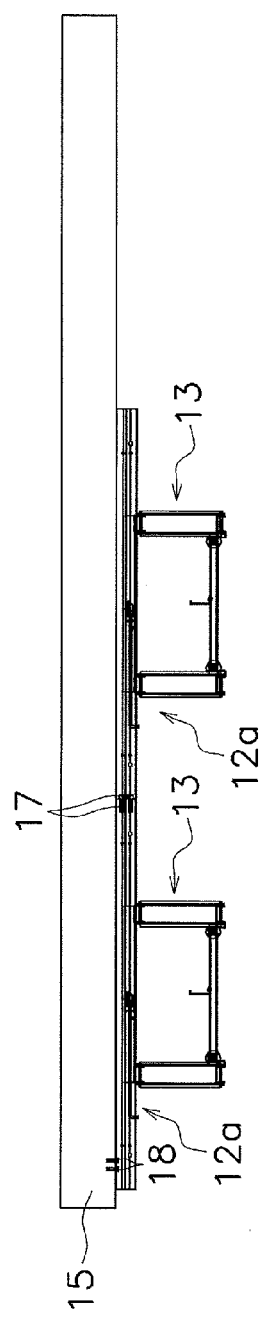
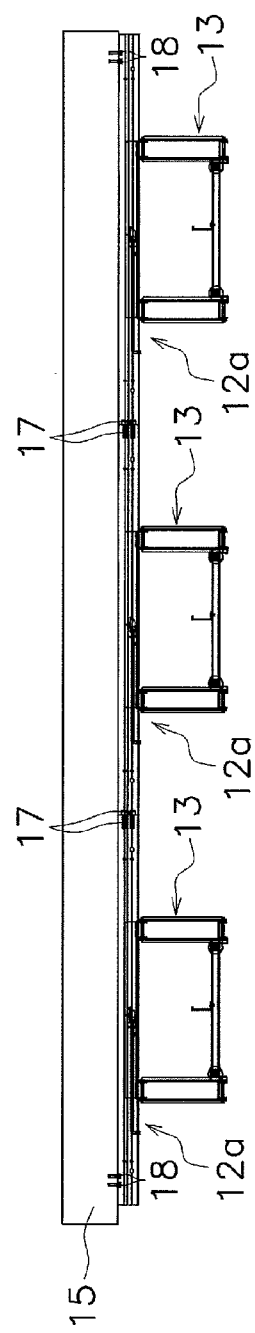
FIG. 7A
FIG. 7B
FIG. 7C

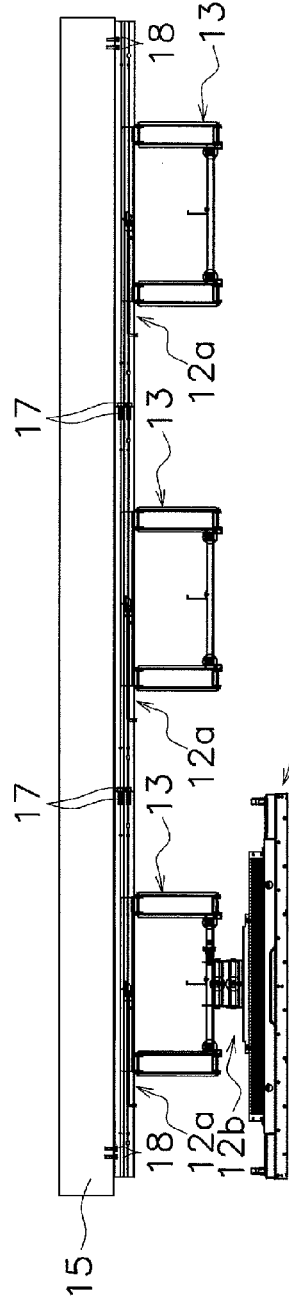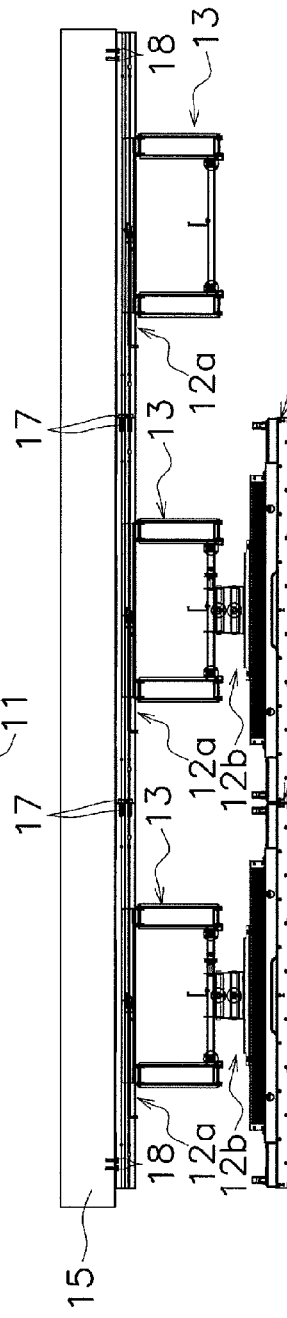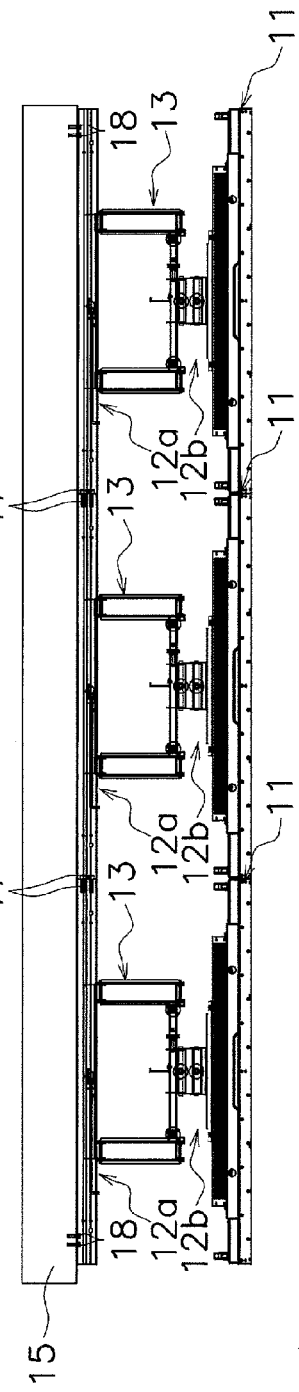

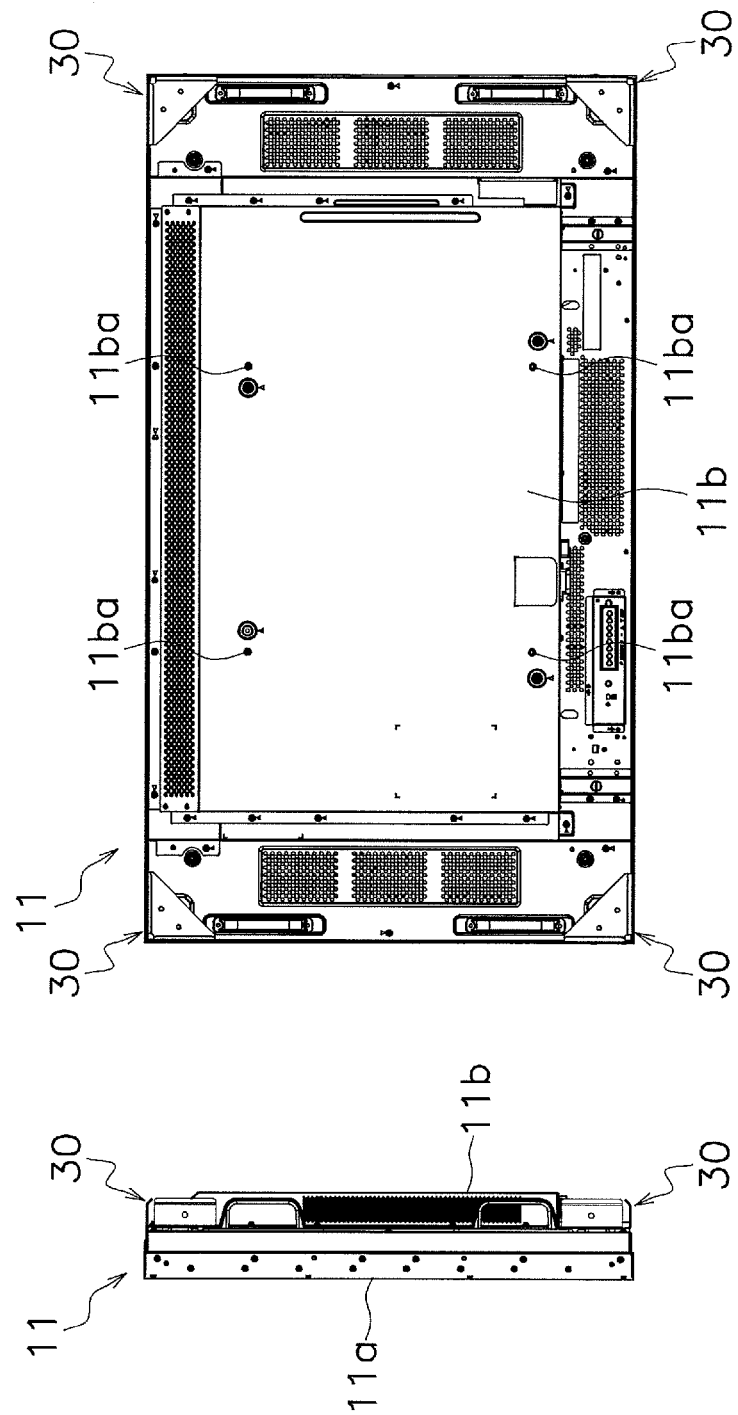

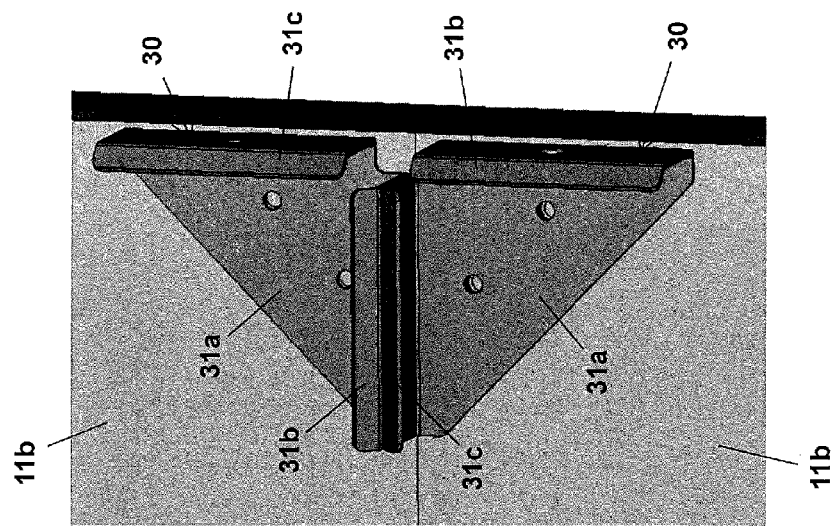
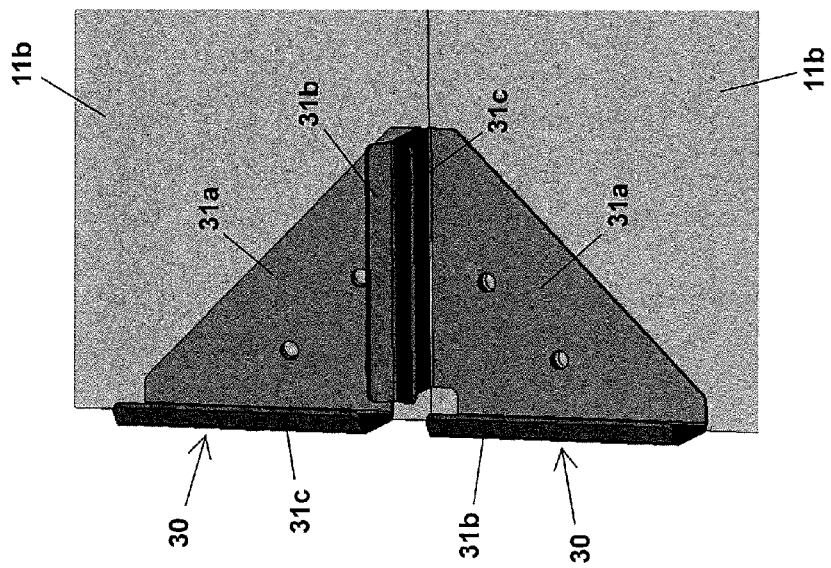
FIG. 13A
FIG. 13B

DISPLAY DEVICE ATTACHMENT FITTING AND DISPLAY DEVICE ATTACHMENT JIG

CROSS-REFERENCE TO RELATED APPLICATIONS

This application claims priority to Japanese Patent Application No. 2014-077951 filed on Apr. 4, 2014. The entire disclosure of Japanese Patent Application No. 2014-077951 is hereby incorporated herein by reference.

BACKGROUND

Recent years have seen growing demand for large display screens formed by combining liquid crystal display panels, plasma display panels, and other such display devices in rows and columns.

The attachment fittings used to constitute a large display screen by combining display devices in rows and columns have been a combination of a stationary frame that is fixed to a wall, a framework, or another such attachment surface, and a movable frame that is pulled out toward the front side of the stationary frame.

For example, Patent Literature 1 (Japanese Laid-Open Patent Application 2011-75757) discloses a wall-hanging attachment device for attaching a specific display device to a wall, the wall-hanging attachment device comprising a frame body having an installation face that is opposite the wall where the device is to be fixed, a catch opening that can catch the installation face of the frame body by means of a specific fitting provided to the wall, a plurality of fixing screw holes that are provided for screwing the frame body to the wall, and a plurality of positioning holes.

With the wall-hanging attachment device disclosed in the above-mentioned publication, it is an easy job to fix the wall-hanging attachment device itself to a wall, and the wall-hanging attachment device itself can also be securely attached to the wall.

However, the following problem was encountered with the conventional wall-hanging attachment device discussed above. Specifically, with the wall-hanging attachment device disclosed in the above publication, individual wall-hanging attachment devices can be accurately attached to a wall, but when a large screen is formed by combining a plurality of display devices in rows and columns, the positioning between the adjacent display devices is also important.

All the configuration of the above wall-hanging attachment device achieves, however, is an increase in the accuracy at which the individual wall-hanging attachment devices are attached to the wall, and it can hardly be considered that there is an increase in the accuracy of the positions of the display devices and the wall-hanging attachment devices disposed adjacently.

It is an object of the present disclosure to provide a display device attachment fitting and a display device attachment jig with which the positional accuracy of display devices can be increased in the formation of a large screen by combining a plurality of display devices in rows and columns.

SUMMARY

The display device attachment fitting pertaining to the present disclosure is used to attach a plurality of display devices to a specific attachment surface in forming a large screen by arranging the display devices in rows, the display device attachment fitting comprising a frame body, a fitting component, and a fixing member. The frame body has the same external shape as the display device, and is attached to the attachment surface, and has stiffness property enough to support the weight of the display device. The fitting component is provided to the frame body on the side where the display device is attached, and supports the rear face side of the display device. The fixing member is provided on the side face of the frame body and fixes the frame body to each other in a state in which the fixing member is in contact with the frame bodies included in the display device attachment fittings of display devices attached at adjacent positions.

The display device attachment jig pertaining to the present disclosure is used to form a large screen by arranging display devices in rows, the display device attachment jig comprising a first jig and a second jig that are attached at mutually opposing positions at the ends of display devices disposed adjacent to one another. The first jig has a planar part that is provided to the end of the display device and is disposed substantially perpendicular to the display screen of the display device, and a protruding part that is provided to the planar part and protrudes from the planar part toward the outside of the display device. The second jig has a planar part that is provided at a position opposite the first jig at the end of the display device, and is disposed substantially perpendicular to the display screen of the display device, and a concave part that is provided to the planar part, is recessed from the planar part toward the inside of the display device, and mates with the protruding part of the first jig.

The display device attachment jig pertaining to the present disclosure is used to form a large screen by arranging display devices in rows, the display device attachment jig comprising a first jig and a second jig that are attached at mutually opposing positions at the ends of display devices disposed adjacent to one another. The first jig has a planar part an open part, and an attraction component. The planar part is provided to the end of the display device and is disposed substantially perpendicular to the display screen of the display device. The open part is formed in the planar part. The attraction component is disposed in the open part so that at least part protrudes from the planar part toward the outside of the display device, is able to move in a direction that intersects the planar part, that is unable to move in a direction that is perpendicular to the display screen, and adheres to metal. The second jig has a planar part and a concave component. The planar part is provided at a position opposite the first jig at the end of the display device, and is disposed substantially perpendicular to the display screen of the display device. The concave part is provided to the planar part, is recessed from the planar part toward the inside of the display device, and the attraction component of the first jig adheres thereto.

EFFECT

With the display device attachment fitting disclosed herein, the positional accuracy of the display devices can be increased in the formation of a large screen by combining a plurality of display devices in rows and columns.

BRIEF DESCRIPTION OF THE DRAWINGS

FIGS. 7A to 7C are plan views of the procedure for attaching the frame body of the attachment fitting included in the display unit in FIG. 1, in the formation of a large screen by using a plurality of display devices;

FIGS. 8A to 8C are plan views of the procedure for attaching a display device to which a fitting component has been mounted, to a frame body that is attached to a wall, in the formation of a large screen by using a plurality of display devices;

FIGS. 10A and 10B are a side view and a rear view of the state when a corner fitting is attached to the four corners of a display device constituting the display unit in FIG. 1;

FIGS. 13A and 13B are detail views of the linked portion of the display devices in FIG. 12;

DETAILED DESCRIPTION OF THE PREFERRED EMBODIMENTS

Embodiment 1

A display unit 10 in which an attachment fitting 12 (display device attachment fitting) pertaining to an embodiment of the present disclosure has been mounted to a display device 11 will now be described through reference to FIGS. 1 to 14.

The directions (up and down, left and right, etc.) mentioned in the following description refer to directions as seen from the front in a state in which the display unit 10 has been fixed to a wall 15.

Configuration of Display Unit 10

Figure 1:
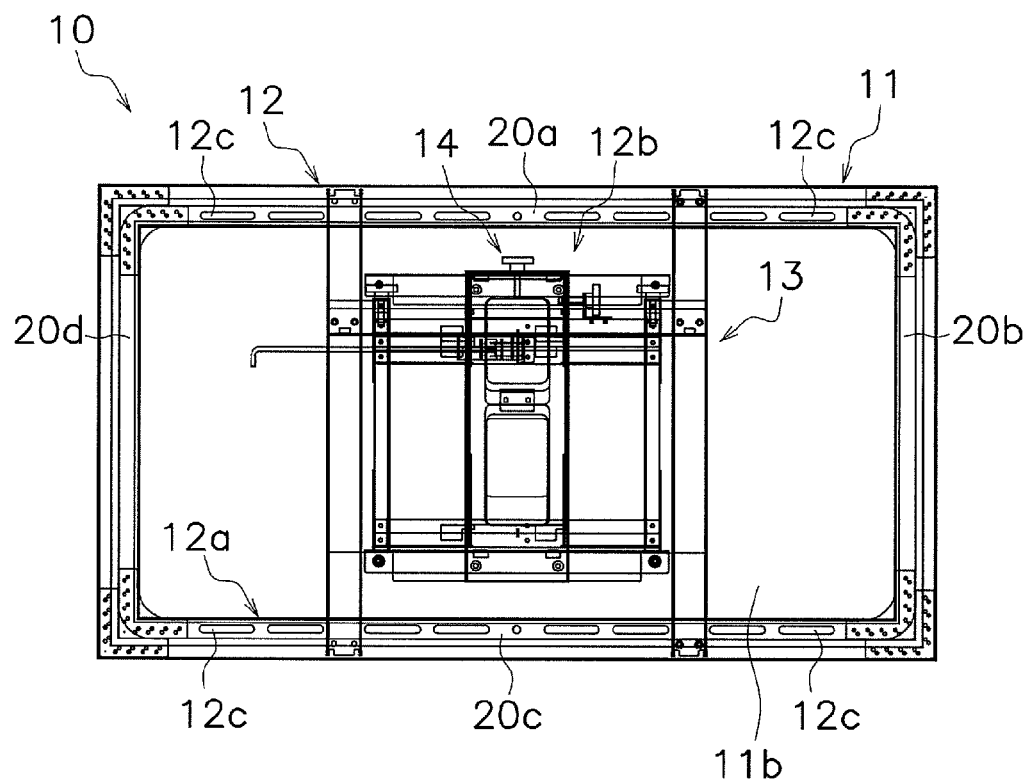
FIG. 1 is a rear view of a display unit to which the display device attachment fitting pertaining to an embodiment of the present disclosure has been mounted, as seen from the opposite side of the display screen.

The display unit 10 pertaining to this embodiment is a unit for forming a large screen by combining a plurality of the display devices 11 in the vertical and lateral directions. As shown in FIG. 1, this unit comprises the display device 11, the attachment fitting 12, a movement mechanism 13, and a fine adjustment mechanism 14.

Display Device 11

Figure 6:
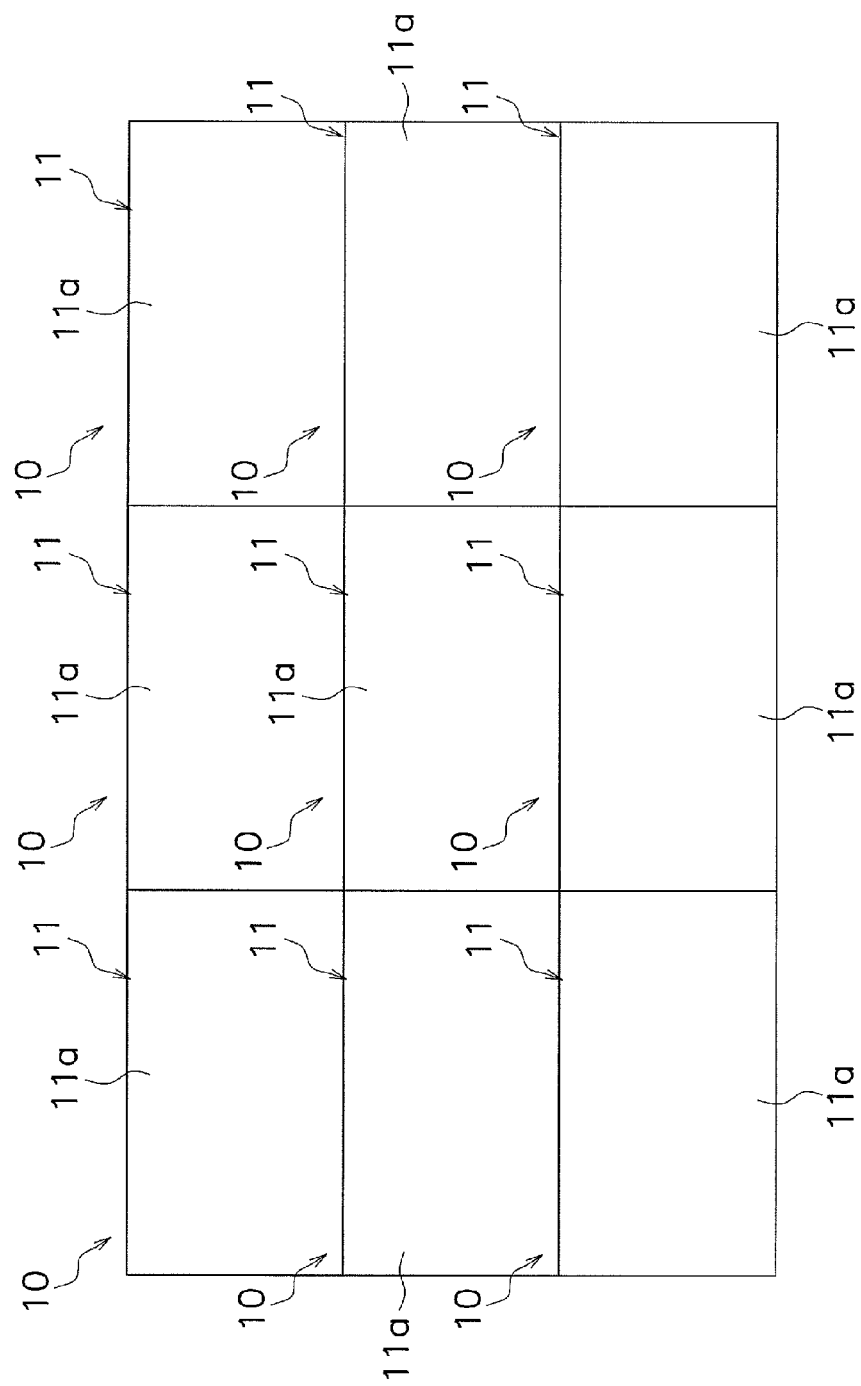
FIG. 6 is a front view of the configuration of a large screen formed by combining three columns and three rows of the display unit in FIG. 1.

The display device 11 is a display device such as a liquid crystal display panel, a plasma display panel, or the like, and a large screen is formed by combining nine of the display screens 11a of three row and three columns of display devices 11 (see FIG. 6). The display device 11 is configured so that the outer frame is as thin as possible, so that there will be no dropout in the video at the connecting portions between adjacent display screens 11a.

Figure 17A:
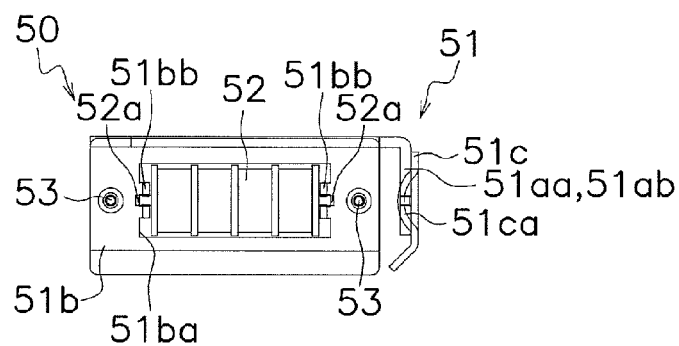
FIGS. 17A and 17B are a plan view and a front view of the configuration of the corner fitting in FIG. 15.

To the display device 11 are attached the attachment fitting 12, the movement mechanism 13, and the fine adjustment mechanism 14 (discussed below) as various mechanisms for accurately attaching at the specified position on the wall 15 (attachment face) (see FIG. 17A, etc.), on the rear face 11b that is on the opposite side from the display screen 11a.

The display device 11 also has attached to it four corner fittings 30 (display device attachment fittings) for positioning in a direction that is perpendicular to the display screens 11a of adjacent display devices 11. The configuration of the corner fittings 30 will be discussed in detail below.

Attachment Fitting 12

Figure 2A:
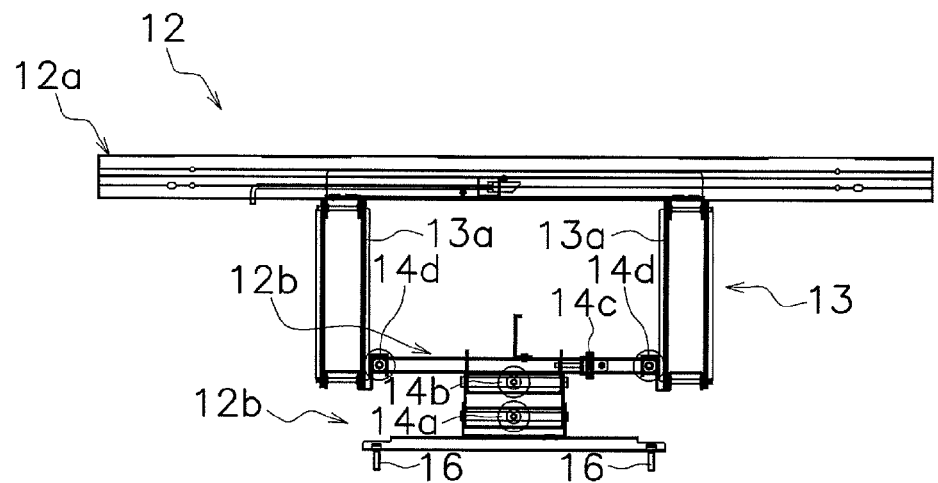
FIGS. 2A and 2B are a plan view and a side view of the configuration of the attachment fitting included in the display unit in FIG. 1.
Figure 2B:
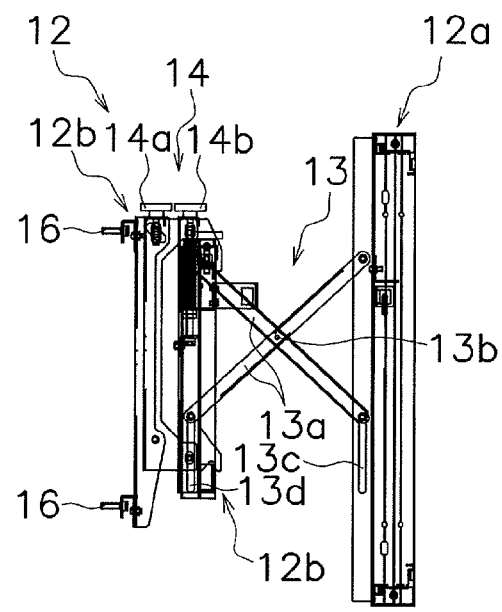

The attachment fitting 12 is used for accurately attaching the display device 11 at the specified position on the wall 15, and has stiffness property enough to support the weight of the display device 11. As shown in FIGS. 1, 2A, 2B, etc., the attachment fitting 12 has a frame body 12a, a fitting component 12b, and slots 12c.

As shown in FIG. 1, the frame body 12a is a square frame produced by putting together two short and two long frames 20a to 20d. As shown in FIGS. 2A and 2B, etc., the external size is the same as that of the display device 11.

The fitting component 12b is a member that connects the frame body 12a with the rear face 11b of the display device 11, and can be attached to and removed from the frame body 12a. The fitting component 12b is attached in the approximate center of the rear face 11b of the display device 11. More specifically, the fitting component 12b is attached to the rear face 11b of the display device 11 by threading four attachment bolts 16 into bolt holes 11ba (see FIG. 10B) formed in the rear face 11b.

Figure 5A:
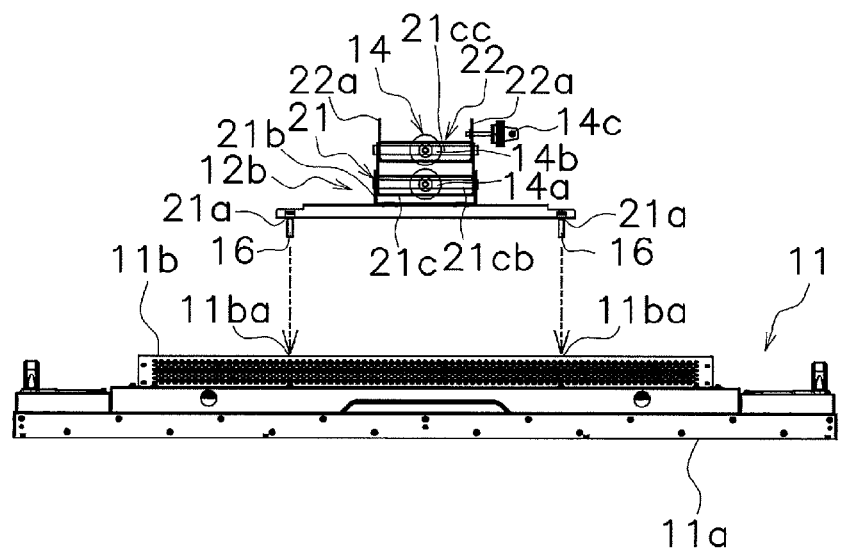
FIGS. 5A and 5B are a plan view and a side view of the state when the fitting component of the attachment fitting included in the display unit in FIG. 1 is attached to the rear face of a display device.
Figure 5B:
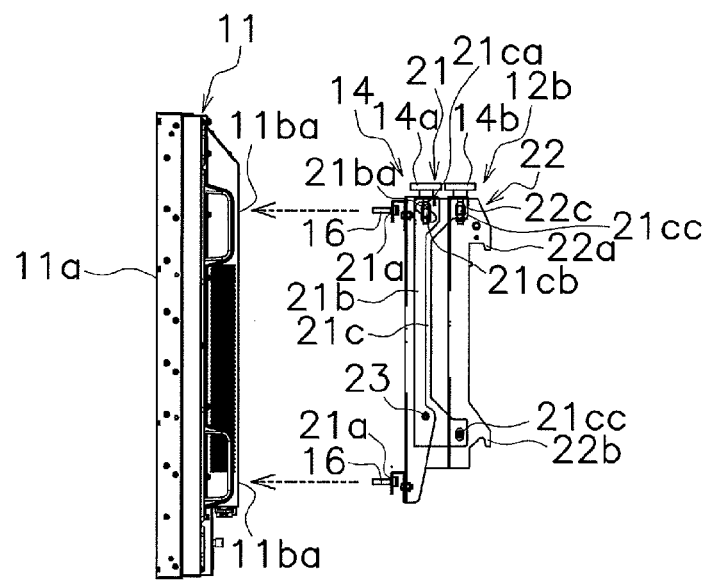

As shown in FIGS. 5A and 5B, the fitting component 12b is attached to the rear face 11b of the display device 11 in a state of being separated from the frame body 12a. As shown in FIGS. 8A to 8C, etc., the fitting component 12b is then linked to the frame body 12a fixed to the wall 15, in a state of being attached to the rear face 11b of the display device 11. The fitting component 12b has a main body part 21 and a linking component 22.

The main body part 21 is connected to the rear face 11b of the display device 11 via the four attachment bolts 16, which go into four bolt holes 21a formed in the upper, lower, left, and right ends. As shown in FIGS. 5A and 5B, the main body part 21 is produced by putting together two members (a first member 21b and a second member 21c).

As shown in FIG. 5A, the first member 21b is a substantially U-shaped member in plan view, and forms the profile of the main body part 21. As shown in FIG. 5B, the first member 21b has slots 21ba formed on both side faces. The slots 21ba are formed at an angle to the vertical direction, and insertion components 21cb on the second member 21c side disposed on the inside of the first member 21b move in an inserted state.

As shown in FIG. 5A, the second member 21c is a substantially square member in plan view, and is disposed on the inside of the first member 21b. A handle 14a (discussed below) is provided to the upper end of the second member 21c. As shown in FIG. 5B, the second member 21c has slots 21ca on both side faces, provided at positions superposing the slots 21ba of the first member 21b, the insertion components 21cb that move up and down in a state of being inserted into the slots 21ba and 21ca formed on both side faces, and insertion components 21cc that move up and down in a state of being inserted into slots 22c on the linking component 22 side.

The slots 21ca are disposed so as to superpose the slots 21ba, and are formed substantially along the vertical direction.

The insertion components 21cb are circular columnar members, and both ends are inserted into the slots 21ba and 21ca formed on both side faces of the first and second members 21b and 21c. The insertion components 21cb move along the slots 21ba and 21ca, which are formed in different directions, when the handle 14a (discussed below) is rotated, and this allows the first member 21b to rotate around a rotation shaft 23 with respect to the second member 21c, and allows the display device 11 to be moved forward at an angle.

The insertion components 21cc are circular columnar members just like the insertion components 21cb, and are inserted into the slots 22c formed on both side faces of the linking component 22.

The linking component 22 is integrally connected to the rear face side of the main body part 21, and as shown in FIGS. 5A and 5B, is connected to one end of a pair of left and right linking members 13a. The linking component 22 has latching components 22a and 22b that are latched to part of the frame body 12a during linking to the frame body 12a, and the slots 22c formed in both side faces.

The latching components 22a and 22b are formed so as to protrude downward from the upper, lower, left, and right ends of the linking component 22. The latching components 22a and 22b are also fixed on the fitting component 12b side so as to pull on the portion that sticks out downward.

The slots 22c are formed substantially along the vertical direction on the two side faces of the linking component 22. Both ends of the above-mentioned circular columnar insertion components 21cc are inserted into the slots 22c, and these are moved up and down by rotating a handle 14b (discussed below). Consequently, the main body part 21 that supports the rear face 11b side of the display device 11 can be moved in the up and down direction with respect to the linking component 22 by rotating the handle 14b.

As shown in FIG. 1, a plurality of the slots 12c are formed in the faces that come into contact with the wall 15 on the frames 20a and 20c on the long-edge sides, out of the frames 20a to 20d that constitute the frame body 12a. As shown in FIGS. 7A to 7C, etc., the slots 12c allow inserted wall fixing bolts 18 to be threaded into bolt holes (not shown) formed on the wall 15 side, thereby fixing the display unit 10 to the wall 15.

Movement Mechanism 13

The movement mechanism 13 is provided in order to change the display unit 10 attached to the wall 15 from a work state (FIGS. 3A and 3B) to an installation state (FIGS. 4A and 4B), that is, to push the display device 11 in toward the wall 15 side.

The above-mentioned "work state" means a state in which the display unit 10 is in the position where work is performed on the wiring, etc., of the display device 11, or a state in which the display unit 10 is in the position where the display device 11 is linked to the frame body 12a side. The above-mentioned "installation state" means a state in which the work of installing the display device 11 is finished and the display unit 10 can be used.

More specifically, the movement mechanism 13 has a pair of left and right linking members 13a, a rotation shaft 13b, and slots 13c and 13d.

Figure 3A:
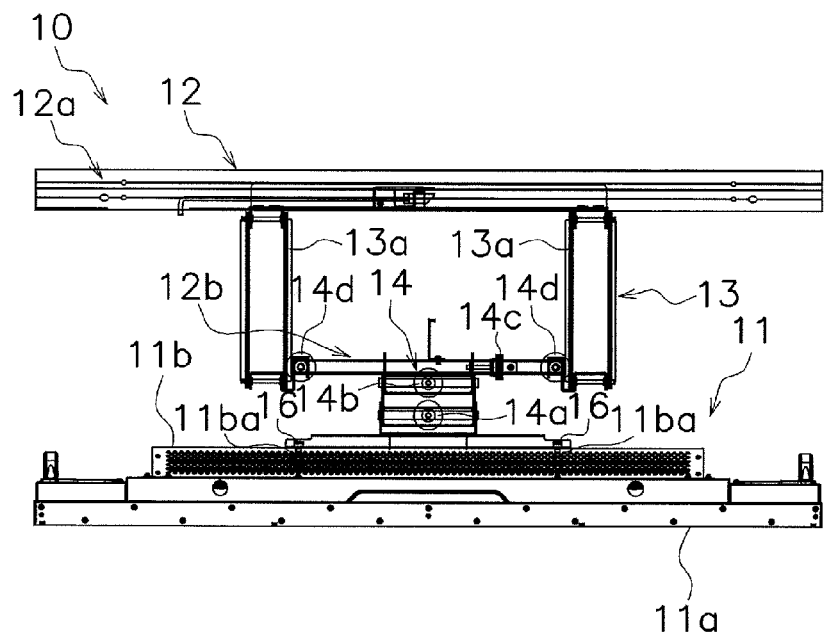
FIGS. 3A and 3B are a plan view and a side view of the configuration of the state when work is being done on the display unit in FIG. 1.
Figure 3B:
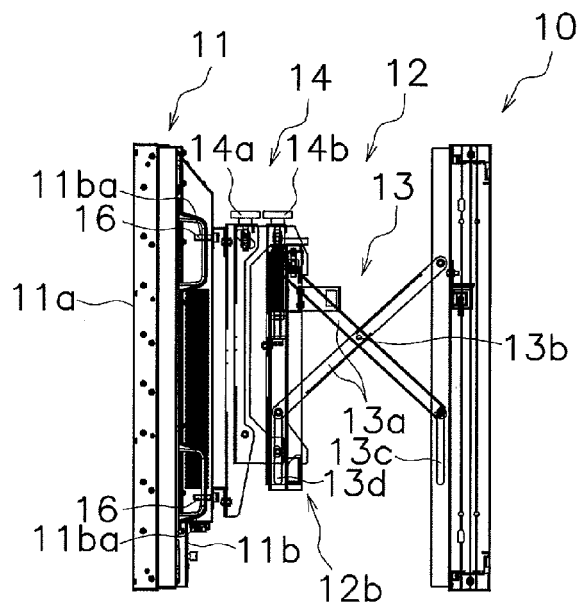

As shown in FIGS. 3A and 3B, the left and right linking members 13a are configured so that the lower ends of the two links can move up and down in a state of being inserted into the slots 13c and 13d.

The rotation shaft 13b is inserted into the center of the two lines that constitute the left and right linking members 13a, and serves as the rotational center for the two links.

The slot 13c is formed substantially along the vertical direction on the side face of the frame body 12a. The slot 13c moves up and down in a state in which the end of one of the links constituting the linking members 13a has been inserted.

The slot 13d is formed substantially along the vertical direction on the side face of the fitting component 12b. The slot 13d moves up and down in a state in which the end of one of the links constituting the linking members 13a has been inserted.

More specifically, in the work state shown in FIG. 3B, the frame body 12a and the fitting component 12b have been separated, and the lower ends of the linking members 3a are located at the upper end portions of the slots 13c and 13d. In the installation state shown in FIG. 4B, on the other hand, the frame body 12a and the fitting component 12b are close together, and the lower ends of the linking members 13a are located at the lower end portions of the slots 13c and 13d.

Consequently, the distance between the frame body 12a and the fitting component 12b can be expanded and contracted by rotating the left and right linking members 13a of the movement mechanism 13 around the rotation shaft 13b.

Fine Adjustment Mechanism 14

The fine adjustment mechanism 14 is provided to make fine adjustments to the orientation (up and down, left and right, inclination, etc.) of the display device 11 of the display unit 10 fixed to the wall 15. As shown in FIGS. 2A, 2B, 5A, and 5B, the fine adjustment mechanism 14 is provided on the side where the frame body 12a is attached to the wall 15, and on the side where the fitting component 12b is attached on the rear face 11b side of the display device 11. The fine adjustment mechanism 14 has four handles (manipulation components) 14a to 14d.

As shown in FIGS. 5A and 5B, the handle 14a is provided to the upper part of the main body part 21 on the fitting component 12b side, and finely adjusts the tilt angle of the display device 11 with respect to the wall 15.

More specifically, when the handle 14a is rotated, the insertion components 21cb move up and down along the slots 21ba and 21ca formed in the side faces on both sides of the main body part 21 that constitutes the fitting component 12b.

Here, the slots 21ba are formed at an angle, and the slots 21ca are formed substantially along the vertical direction. Therefore, when the handle 14a is rotated, the insertion components 21cb move along the slots 21ba and slots 21ca, which are formed in different directions.

Consequently, the display device 11 can be tilted forward by rotating the first member 21b around the rotation shaft 23 with respect to the second member 21c. Specifically, the handle 14a can be operated to finely adjust the tilt angle at which the display screen 11a of the display device 11 is tilted forward.

As shown in FIGS. 5A and 5B, the handle 14b is provided to the upper part of the linking component 22 on the fitting component 12b side, and the position of the display device 11 in the up and down direction is finely adjusted by moving the display device 11 in parallel in the up and down direction.

More specifically, when the handle 14b is rotated, the insertion components 21cc move up and down along the slots 22c formed in the side faces of the fitting component 12b. The insertion components 21cc here are integrated with the main body part 21.

Consequently, the main body part 21 that supports the rear face 11b side of the display device 11 can be moved in parallel in the up and down direction with respect to the linking component 22 by rotating the handle 14b. Specifically, the position of the display device 11 in the up and down direction with respect to the wall 15 can be finely adjusted by operating the handle 14b.

As shown in FIGS. 2A and 2B, the handle 14c is provided to the upper side face of the linking component 22 on the fitting component 12b side, and the position of the display device 11 in the up and down direction is finely adjusted by moving the display device 11 in parallel in the left and right direction.

More specifically, the display device 11 can be moved in the left and right direction with respect to the frame body 12a by rotating the handle 14c. That is, operation of the handle 14c allows for fine adjustment of the position of the display device 11 in the left and right direction with respect to the wall 15.

As shown in FIGS. 2A and 2B, the handles 14d are provided to both ends of a member that connects the left and right linking members 13a on the frame body 12a side, and adjust the inclination of the display device 11 in the left and right direction.

More specifically, the display device 11 can be moved in the up and down direction with respect to the frame body 12a by rotating the handles 14d. That is, the inclination of the display device 11 in a direction parallel to the display screen can be finely adjusted with respect to the wall 15 by operating the two handles 14d by different amounts.

In this embodiment, as shown in FIGS. 2A and 2B, the four handles 14a to 14d are disposed at the upper part of the attachment fitting 12 on the rear face side of the display device 11. Consequently, fine adjustment of the position of the display device 11 in the up and down direction and the left and right direction and its tilt angle, inclination, and so forth with respect to the 15 can be carried out more smoothly.

Installation Procedure when Forming Large Screen

As shown in FIG. 6, with the display unit 10 in this embodiment, a large screen is formed by disposing nine display devices 11 in three rows and three columns. The procedure for installing the display units 10 in the formation of the large screen shown in FIG. 6 will now be described through reference to FIGS. 7A to 9C.

Specifically, as shown in FIG. 7A, in attaching the display units 10 to the wall 15, first, of the nine display units 10, attachment begins with the display unit 10 that will be attached in the lower-left corner. More specifically, of the attachment fitting 12 constituting the display unit 10, just the frame body 12a to which the movement mechanism 13 is attached is fixed to the wall 15 with the wall fixing bolts 18. The wall fixing bolts 18 are inserted into the slots 12c (see FIG. 1) formed in the frame 20a constituting the frame body 12a, and are fixed in bolt holes formed on the wall 15 side.

As discussed above, the frame body 12a here is formed so as to have the same external dimensions as the display device 11. Thus, when the display units 10 are laid out longitudinally and laterally, the positioning of the display device 11 can be accomplished at the same time by connecting the frame bodies 12a to each other.

As shown in FIG. 7B, the frame body 12a of the display unit 10 in the middle of the bottom row is disposed to the right of the frame body 12a of the display unit 10 in the lower-left corner, and fixing bolts 17 are used to join the side faces of the frame bodies 12a.

The frame body 12a here has the same external size as the display device 11, and has stiffness property enough to support the display device 11, so the right angles of the frames 20a to 20d will also accurately match the external shape of the display device 11. Therefore, as shown in FIG. 7B, in a state in which the side faces of the frame bodies 12a are butted together, the positioning of the display device 11 can be accomplished at the same time by using the fixing bolts 17 to join the frame bodies 12a together. Since the frame body 12a has sufficiently stiffness property, there is no need for the frame body 12a installed in the middle of the bottom row to be fixed to the wall 15, and only the left and right frame bodies 12a need be fixed to the wall 15.

Then, as shown in FIG. 7C, the frame body 12a of the lower-right display unit 10 is disposed to the right of the frame body 12a of the middle display unit 10 in the bottom row, and the fixing bolts 17 are used to join the side faces of the frame bodies 12a together.

Here, the right end of the frame body 12a is fixed to the wall 15 with the wall fixing bolts 18, just as is the lower-left frame body 12a. The wall fixing bolts 18 are inserted into the slots 12c (see FIG. 1) formed in the frame 20a constituting the frame body 12a, and are fixed in bolt holes formed on the wall 15 side.

Next, the procedure shown in FIGS. 7A to 7C is repeated for the frame bodies 12a to be installed in the middle row, and these are fixed to the wall 15. This allows the six frame bodies 12a in the lower and middle rows to be fixed to the wall 15.

Then, the procedure shown in FIGS. 7A to 7C is repeated for the frame bodies 12a to be installed in the top row, and these are fixed to the wall 15. This allows the nine frame bodies 12a in the lower, middle, and top rows to be fixed to the wall 15.

In this embodiment, as discussed above, after all nine of the frame bodies 12a have been fixed to the wall 15, the units including a display device 11 in which a fitting component 12b has been attached on the rear face 11b side are attached according to the procedure shown in FIGS. 8A to 8C.

More specifically, as shown in FIG. 8A, first the display device 11 is attached to the frame body 12a that is attached in the lower-left corner (out of the nine display units 10).

At this point, the fitting component 12b is attached on the rear face 11b side of the display device 11. Thus fixing the latching components 22a and 22b of the fitting component 12b in a state of being hooked onto the frame body 12a side allows the display device 11 to be linked with the frame body 12a side.

Similarly, as shown in FIG. 8B, the display device 11 in the middle of the bottom row to the right of the lower-left display device 11 is linked to the frame body 12a side.

Similarly, as shown in FIG. 8C, the lower-right display device 11 to the right of the display device 11 in the middle of the bottom row is linked to the frame body 12a side.

Next, the procedure shown in FIGS. 8A to 8C is repeated for the display devices 11 installed in the middle row, and the display devices 11 are fixed to the frame bodies 12a that have been fixed to the wall 15. This allows the six display devices 11 in the bottom and middle rows to be fixed to the wall 15.

Then, the procedure shown in FIGS. 8A to 8C is repeated for the display devices 11 to be installed in the top row, and the display devices 11 are fixed to the frame bodies 12a that have been fixed to the wall 15. This allows the nine display devices 11 in the lower, middle, and top rows to be fixed to the wall 15.

Figure 9A:
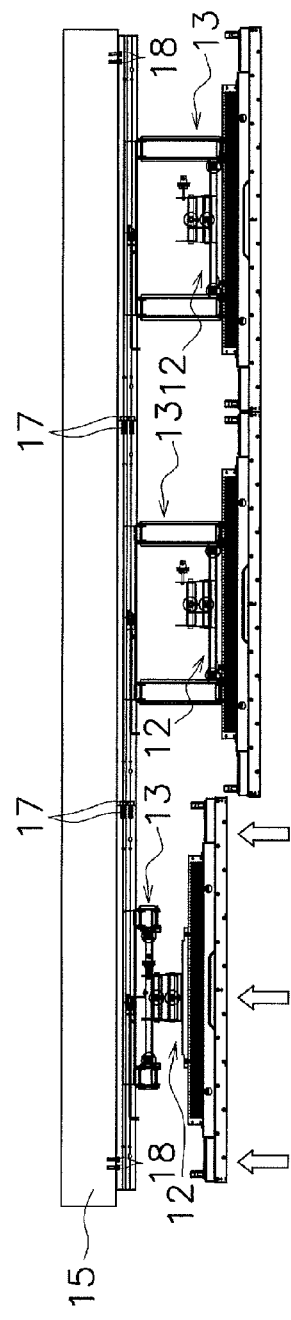
FIGS. 9A to 9C are plan views of the procedure for changing a display unit attached to a wall from a work state to an installation state in the formation of a large screen by using a plurality of display devices.
Figure 9B:
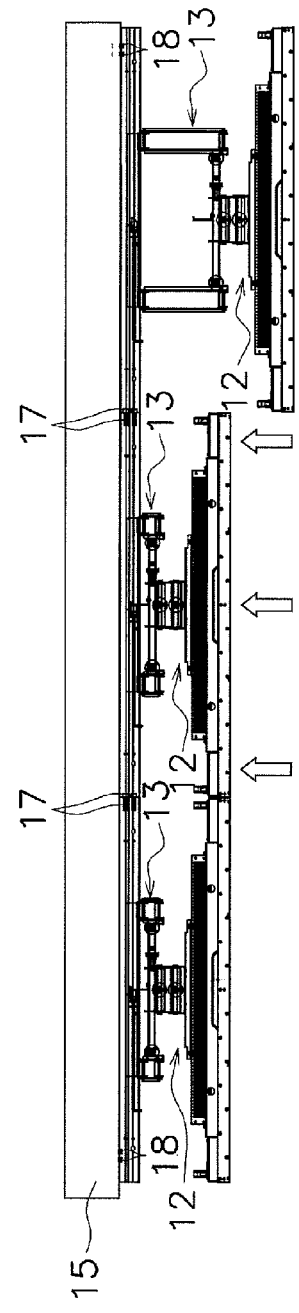
Figure 9C:
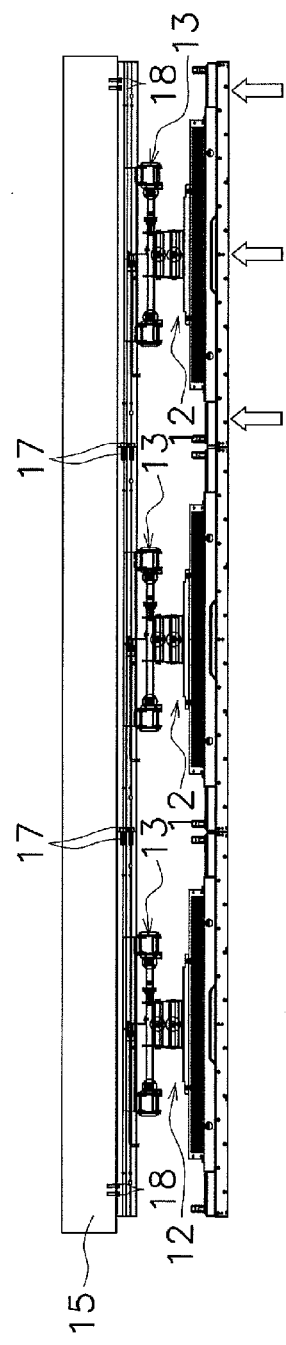

In this embodiment, as discussed above, after all nine of the display devices 11 have been fixed to the wall 15, the display devices 11 are pushed in to change from the work state to the installation state according to the procedure shown in FIGS. 9A to 9C.

More specifically, as shown in FIG. 9A, first the display device 11 attached in the lower-left corner (out of the nine display units 10) is pushed in a direction that is perpendicular to the display screen 11a (see the white arrow in the drawing) to change it from the work state to the installation state.

At this point the movement mechanism 13 is attached on the rear face 11b side of the display device 11. Thus, when the display device 11 is pushed in, it is fixed at the position of the installation state by the movement mechanism 13.

Similarly, as shown in FIG. 9B, the display device 11 in the middle of the bottom row to the right of the lower-left display device 11 is pushed in a direction that is perpendicular to the display screen 11a (see the white arrow in the drawing) to change it from the work state to the installation state.

Similarly, as shown in FIG. 9C, the lower-right display device 11 to the right of the display device 11 in the middle of the bottom row is pushed in a direction that is perpendicular to the display screen 11a (see the white arrow in the drawing) to change it from the work state to the installation state.

Next, the procedure shown in FIGS. 9A to 9C is repeated for the display devices 11 installed in the middle row, and the display devices 11 fixed to the wall 15 are changed from the work state to the installation state. This allows the six display devices 11 in the bottom and middle rows to be changed to the installation state.

Then, the procedure shown in FIGS. 9A to 9C is repeated for the display devices 11 to be installed in the top row, and the display devices 11 that have been fixed to the wall 15 are changed from the work state to the installation state. This allows the nine display devices 11 in the lower, middle, and top rows to be changed to the installation state.

The display unit 10 in this embodiment forms a large screen by joining together, at adjacent portions, the frame bodies 12a having the same external shape as the display devices 11, by the procedure given above, which improves the positional accuracy of the display devices 11 and improves the flatness of the display screens 11a of the display devices 11. This means that fewer steps are required during installation than in the past, and the installation cost can be significantly reduced.

Also, since the attachment fitting 12, including the frame body 12a fixed to the wall 15, has enough stiffness property to support the weight of the display device 11, the structure on the wall 15 can be simple.

Positioning Between Adjacent Display Devices 11

The mechanism for positioning the adjacent display devices 11 in a direction that is perpendicular to the display screens 11a in changing the nine display devices 11 in the bottom, middle, and top rows to the installation state as shown in FIG. 9C will now be described through reference to FIGS. 10A to 14.

Specifically, as shown in FIGS. 10A and 10B, in this embodiment the corner fittings 30 attached to the four corners of the display device 11 are used to position the display device 11 in a direction that is perpendicular to the display screen 11a.

Corner Fittings 30

The corner fittings 30 are attached to the four corners of the display device 11 as shown in FIGS. 10A and 10B in order to position the adjacent display devices 11 in a direction that is perpendicular to the display screens 11a in the formation of a large screen (see FIG. 6) by combining a plurality of display devices 11.

Figure 11A:
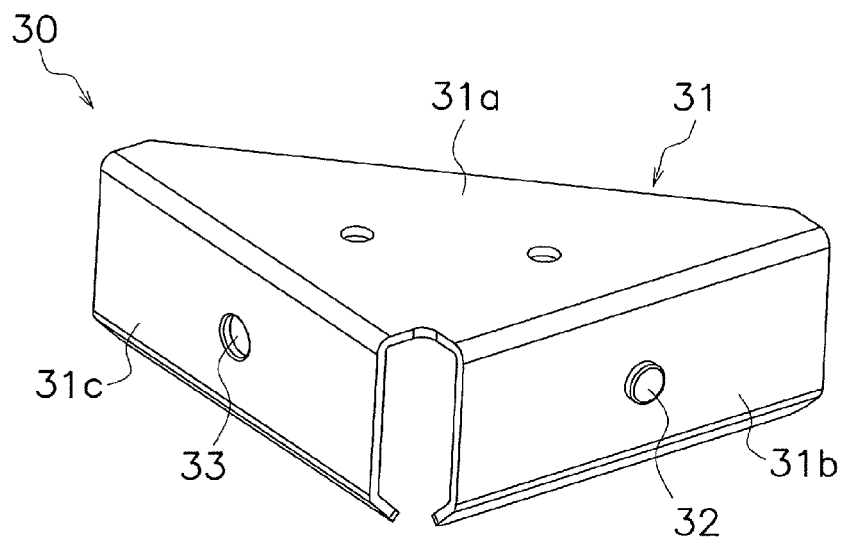
FIGS. 11A and 11B are oblique views of the configuration of the corner fitting in FIG. 10.
Figure 11B:
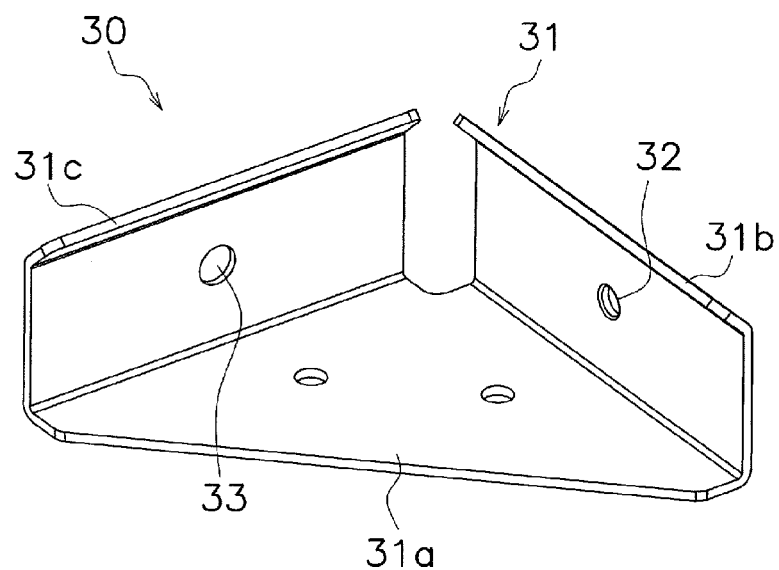

As shown in FIGS. 11A and 11B, the corner fittings 30 each have a main body part 31, a protrusion 32, and an engagement hole (concave component) 33.

As shown in FIGS. 11A and 11B, the main body part 31 is constituted by putting together flat members, and has a linking plate 31a, a planar part (first jig; planar part) 31b, and a planar part (second jig; planar part) 31c.

The linking plate 31a is a substantially triangular plate, and is linked to and integrated with the planar parts 31b and 31c that are disposed perpendicularly along the two edges besides the bottom edge of the approximate triangular shape.

The planar part 31b is a substantially triangular plate, and is linked perpendicularly to the linking plate 31a.

The planar part 31c is similar to the planar part 31b in that it is a substantially triangular plate, and is linked perpendicularly to the linking plate 31a.

The protrusion 32 is a circular columnar portion with a diameter of 8 mm formed in the approximate center of the planar part 31b, and protrudes outward and parallel to the display screen 11a in a state of attachment to the corner portion of the display device 11.

The engagement hole 33 is a through-hole with a diameter of 8.2 mm formed in the approximate center of the planar part 31c, and mates with the protrusion 32 of the corner fitting 30 attached on the side by the adjacently disposed display device 11, and this prevents the adjacent display devices 11 from becoming misaligned in a direction perpendicular to the display screen 11a.

In this embodiment, the corner fittings 30 configured as above are used to position the display devices 11 in a direction perpendicular to the display screen 11a according to the following procedure.

Figure 12:
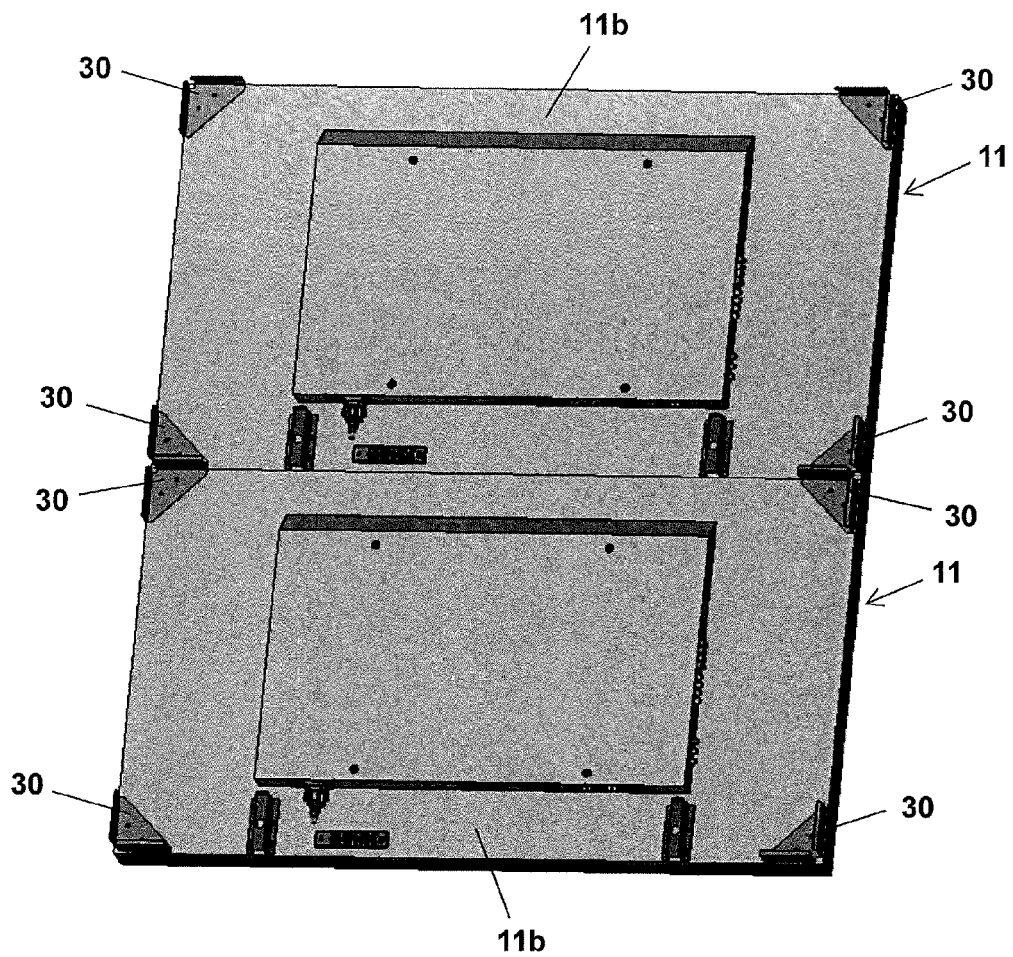
FIG. 12 is an oblique view of the state when two display devices are positioned one above the other, using the corner fitting in FIG. 11A.

As shown in FIG. 12, when display devices 11 that are vertically adjacent are positioned, for example, the positioning is accomplished by putting together the corner fittings 30 provided at both ends of the top face of the display device 11 in the lower row and the corner fittings 30 provided at both ends of the bottom face of the display device 11 in the upper row.

Here, the installation needs to be very accurate so that there are no gaps between the bottom faces of the display devices 11 in the upper rows and the top faces of the display devices 11 in the lower rows. Therefore, both positional accuracy in a direction parallel to the display screen 11a of the display device 11, and positional accuracy in a direction perpendicular to the display screen 11a are required.

In this embodiment, in a state in which the bottom faces of the display devices 11 in the upper rows are in contact with the top faces of the display devices 11 in the lower rows, as shown in FIGS. 13A and 13B, the corner fittings 30 attached to the display devices 11 in the upper rows and the corner fittings 30 attached to the display devices 11 in the lower rows will be in contact at the planar part 31b and the planar part 31c.

Figure 14:
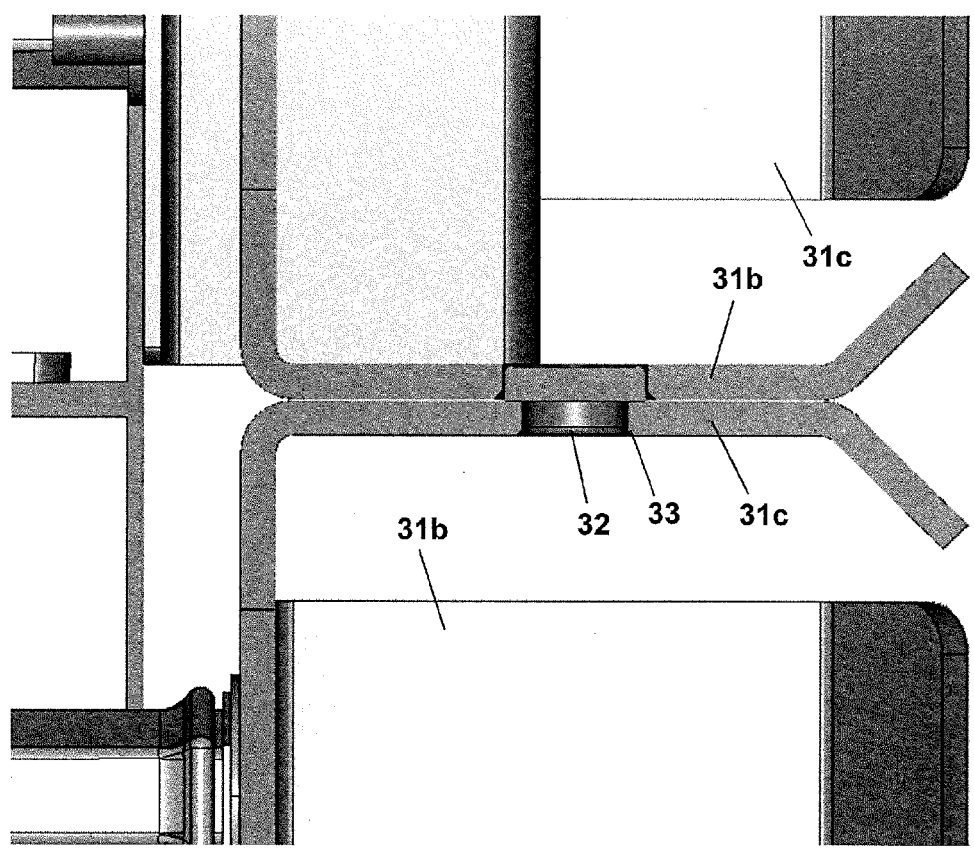
FIG. 14 is a cross section of the linked portion in FIG. 13A.

As shown in FIG. 14, since the planar part 31b is provided with the protrusion 32 that protrudes toward the engagement hole 33 of the opposing planar part 31c, the protrusion 32 mates with the engagement hole 33, putting the two in an engaged state.

Specifically, as shown in FIG. 9B, etc., and as discussed above, when the display devices 11 are pushed in to achieve the installation state, the protrusions 32 and the engagement holes 33 of the corner fittings 30 engage with each other as shown in FIG. 14 at the portions where the adjacent display devices 11 come into contact, and this affords the positioning of the display devices 11.

Consequently, since the display devices 11 are installed in a state of high positional accuracy, the large screen shown in FIG. 6 can be installed in a state that is free of gaps.

As shown in FIGS. 9B and 9C, etc., in a state in which the display devices 11 have been pushed in to achieve the installation state, if the corner fittings 30 (the protrusion 32 and the engagement hole 33) should be out of position, or if there should be a gap between adjacent display screens 11a, the above-mentioned fine adjustment mechanism 14 should be used to finely adjust the position or orientation of the display devices 11.

Embodiment 2

The corner fittings (display device attachment fittings) 50 pertaining to another embodiment of the present disclosure will now be described through reference to FIGS. 15 to 20.

Figures 15A, 15B:
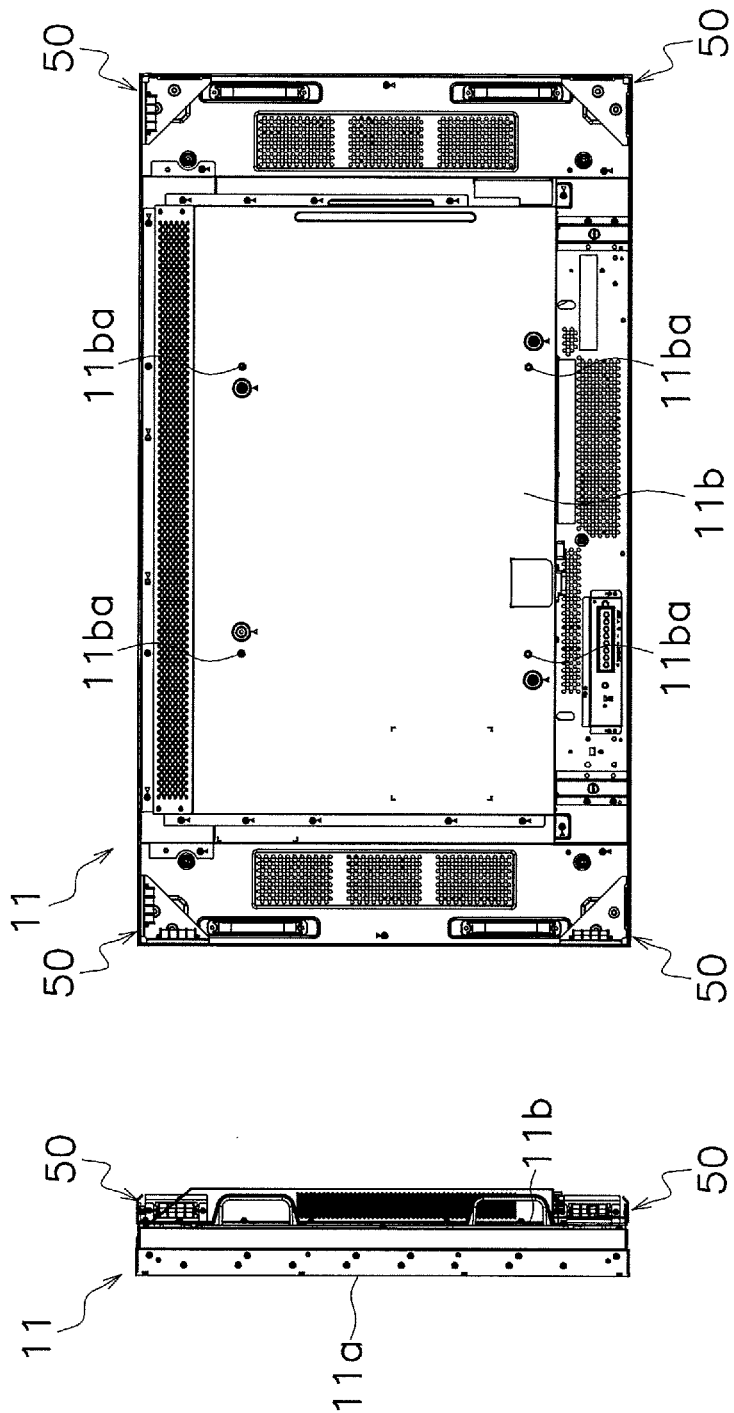
FIGS. 15A and 15B are a side view and a rear view of the state when the corner fitting pertaining to another embodiment of the present disclosure is attached to the four corners of a display device.

The corner fittings 50 in this embodiment are similar to the corner fittings 30 in Embodiment 1 above in that they are attached to the four corners of the display devices 11 as shown in FIGS. 15A and 15B in order to position adjacent display devices 11 in a direction that is perpendicular to the display screens 11a in the formation of a large screen (see FIG. 6) by putting together a plurality of display devices 11.

Figures 16A, 16B, 16C:
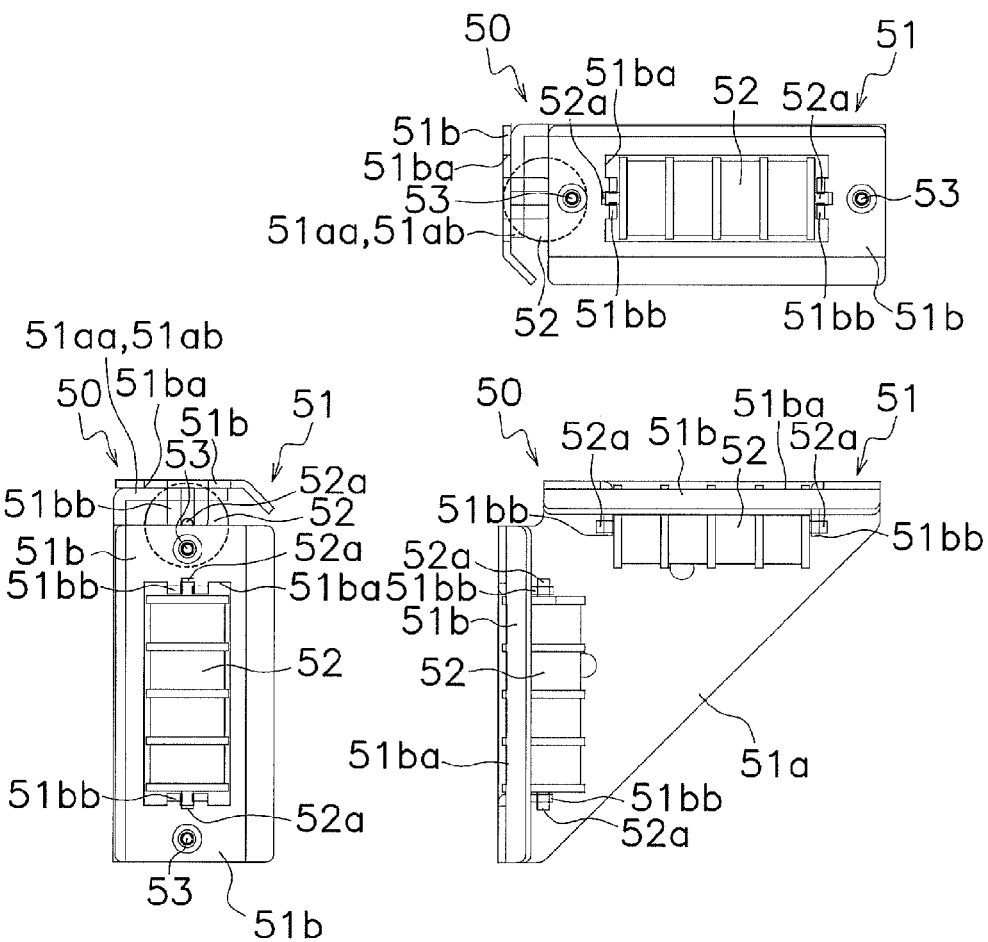
FIGS. 16A to 16C are a plan view, a side view, and a front view of the configuration of the corner fitting in FIG. 15.

As shown in FIGS. 16A to 16C, the corner fittings 50 each have a main body part 51, magnets (attraction components) 52, and bolts 53.

As shown in FIGS. 16A to 16C, the main body part 51 is constituted by putting together flat members, and has a linking plate 51a, planar parts (first jigs; planar parts) 51b, and a planar part (second jig; planar part) 51c.

In this embodiment, the corner fittings 50 have three different configurations in order to form a mated state with the corner fittings 50 disposed opposite each other.

More specifically, in the corner fitting 50 shown in FIGS. 16A to 16C, two of the planar parts 51b, which each have a magnet 52, are linked to the linking plate 51a. In the corner fitting 50 shown in FIGS. 17A, 17B, and 18A, a planar part 51b having a circular columnar magnet 52 is combined with a planar part 51c having a concave component 51ca that mates with the outer peripheral face of the magnet 52. Furthermore, in the corner fitting 50 shown in FIG. 18B, two of the planar parts 51c each having a concave component 51ca are linked to the linking plate 51a.

The various members constituting the three different corner fittings 30 will now be described.

As shown in FIGS. 16A to 16C, the linking plate 51a is a substantially triangular flat member, and has a pair of support components 51aa and 51ab that are disposed along a direction that is perpendicular to the plane of the linking plate 51a, from the two edges besides the bottom edge of the approximate triangular shape. The support components 51aa and 51ab are linked and integrated with the planar part 51b or the planar part 51c by using the bolts 53.

The planar part 51b is a substantially square flat member, and is linked by the bolts 53 to the support components 51aa and 51ab in a direction that is perpendicular to the linking plate 51a. Also, the planar part 51b has an opening 51ba in its center portion, and axial support components 51bb at both ends in the lengthwise direction.

The circular columnar magnet 52 is attached on the inside of the opening 51ba so that the circular columnar outer peripheral face protrudes outward from the planar part 51b.

The axial support components 51bb are U-shaped members attached so as to protrude from a face on the inside of the planar part 51b, and they support a shaft 52a that is provided at both ends in the axial direction of the magnet 52 (discussed below), at the open portion on the inside of the U shape. More specifically, the axial support components 51bb support the shaft 52a at both ends of the magnet 52 in a state in which movement is possible in a direction perpendicular to the plane of the planar part 51b (see the arrow direction in FIG. 20).

Figure 17B:
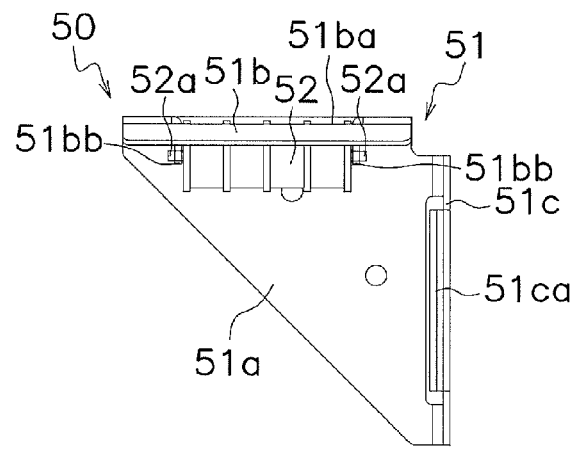
Figure 18A:
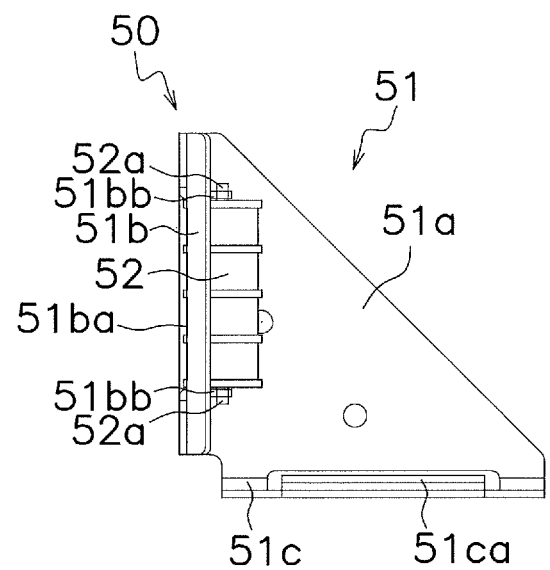
FIGS. 18A and 18B are front views of the configuration of the corner fitting in FIG. 15.
Figure 18B:
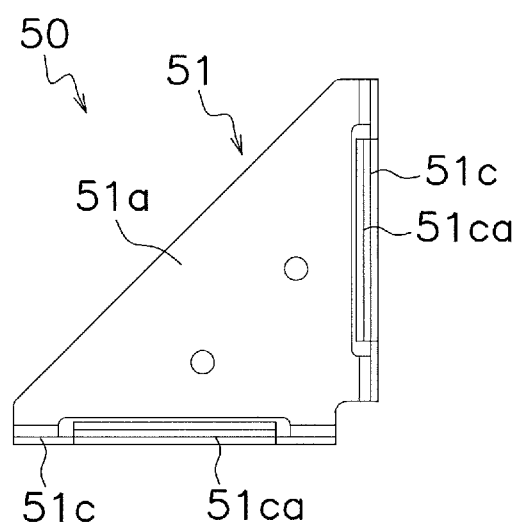

As shown in FIG. 17B, the planar part 51c is similar to the planar part 51b in that it is a substantially square flat member, and is linked by the bolts 53 to the support components 51aa and 51ab in a direction that is perpendicular to the linking plate 51a. Also, the planar part 51c is formed from metal so as to be attracted to the circular columnar magnet 52. A concave component 51ca that mates with the circular columnar outer peripheral face of the circular columnar magnet 52 when attracted to the magnet 52 is formed in the center portion of the planar part 51c.

The magnet 52 is attached in the opening 51ba formed in the approximate center portion of the planar part 51b, and has a circular columnar shape. The magnet 52 has the shaft 52a, which serves as the center axis of the circular columnar shape, at both ends in the lengthwise direction.

The shaft 52a provided at both ends of the magnet 52 is supported by the axial support components 51bb formed in the inner face of the planar part 51b so as to be movable in a direction perpendicular to the planar part 51b. The movement direction of the magnet 52 is restricted by the shape of the axial support components 51bb, and movement in directions other than the above-mentioned direction perpendicular to the planar part 51b is restricted.

In this embodiment, three different kinds of corner fittings 50 configured as above are used to position the display devices 11 in a direction perpendicular to the display screens 11a, according to the following procedure.

Figure 19:
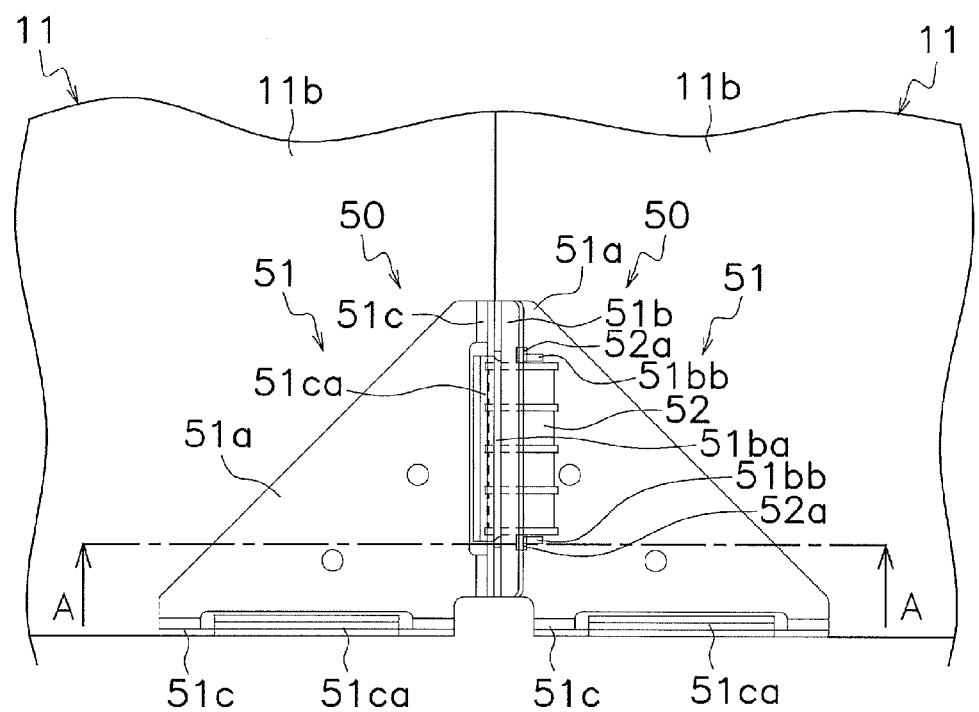
FIG. 19 is a front detail view of a portion of a corner fitting in a state in which two display devices are positioned next to each other in the right and left direction, using the corner fitting in FIG. 15.

Specifically, as shown in FIG. 19, when display devices 11 disposed adjacent on the right and left are positioned, the positioning is accomplished by combining the corner fittings 50 provided at the upper and lower ends of the side face of the display device 11 on the left side, and the corner fittings 50 provided at the upper and lower ends of the side face of the display device 11 on the right side.

Here, the installation needs to be very accurate so that there are no gaps between the side faces or the steps between the display screens 11a, in between the display device 11 on the left side and the display device 11 on the right side. Therefore, both positional accuracy in a direction parallel to the display screen 11a of the display device 11, and positional accuracy in a direction perpendicular to the display screen 11a are required.

Figure 20:
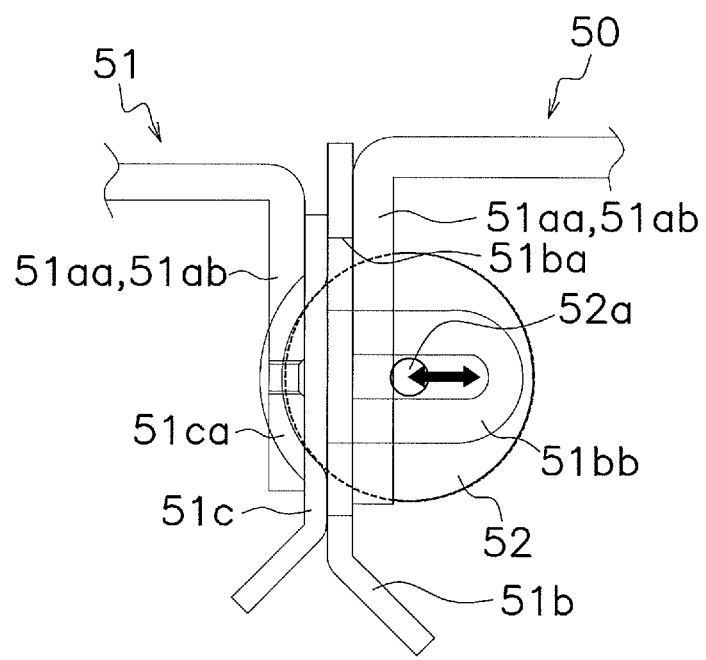
FIG. 20 is a cross section along the A-A line in FIG. 19.

In this embodiment, in a state in which the side face of the display device 11 on the left side is in contact with the side face of the display device 11 on the right side, as shown in FIGS. 19 and 20, the corner fittings 50 attached to the display device 11 on the left side and the corner fittings 50 attached to the display device 11 on the right side will be in contact at the planar part 51b and the planar part 51c.

As shown in FIG. 20, the planar part 51b is provided with a circular columnar magnet 52 that mates with part of the outer peripheral face toward a concave component 51ca of the opposing planar part 51c. Accordingly, when the planar part 51b and the planar part 51c come into contact, the attraction of the magnet 52 causes the magnet 52 to move closer to the metal planar part 51c.

More specifically, as discussed above, the magnet 52 is supported so as to be able to move only in a direction perpendicular to the plane of the planar part 51b, as shown in FIG. 20, on the planar part 51b side. Accordingly, when the concave component 51ca of the metal planar part 51c that is attracted in the direction in which it can move, the magnet 52 protrudes outside from the surface of the planar part 51b, the magnet 52 mates with the concave component 51ca, and the two are engaged.

Specifically, as discussed above, when the display devices 11 are pushed in as shown in FIG. 9B, etc., and thereby changed from the work state to the installation state, the magnets 52 of the corner fittings 50 mate with the concave components 51ca as shown in FIG. 20 at the portion where adjacent display devices 11 are in contact, which allows the display devices 11 to be positioned in a direction perpendicular to the display screens 11a.

As a result, the display devices 11 are installed in a state of good positional accuracy, so the large screen shown in FIG. 6 can be installed in a state that is free of gaps.

Embodiment 3

The corner fittings (display device attachment fittings) 150 pertaining to yet another embodiment of the present disclosure will now be described through reference to FIGS. 21, 22A, and 22B.

Those constituent elements that are the same as the corner fittings 50 in Embodiment 2 above will be numbered the same and will not be described in detail.

Figure 4A:
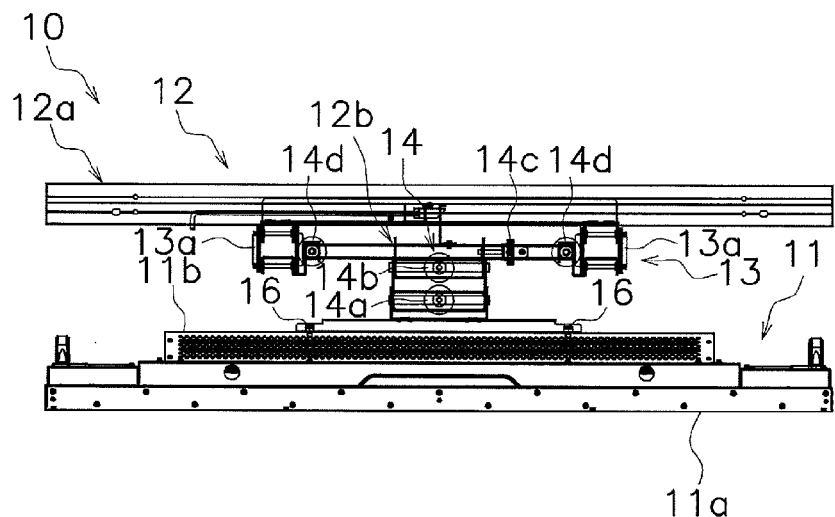
FIGS. 4A and 4B are a plan view and a side view of the configuration of the state when the display unit in FIG. 1 is being installed.
Figure 4B:
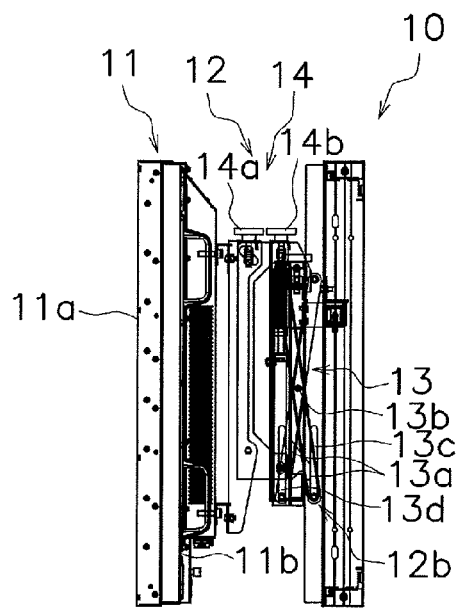

In the job of forming a large screen by putting together a plurality of display devices 11, in the work state shown in FIGS. 3A and 3B, the work of adjusting the positions of the individual display devices 11 and changing to the installation state shown in FIGS. 4A and 4B is repeated over and over.

When adjacent display devices 11 are adjusted, the outer peripheral faces of the magnets 52 mate with the concave components 51ca that are disposed opposite these faces, but in the course of repeatedly switching between the work state and the installation state as discussed above, there is the risk that work efficiency will be reduced if the magnets 52 end up mating with the concave components 51ca against the will of the worker.

In view of this, the corner fittings 150 in this embodiment are such that when a plurality of display devices 11 are put together to form a large screen, the magnetic force of the magnets (attraction components) 52 can be adjusted in order to facilitate fine adjustment in the positioning of adjacent display devices 11.

Specifically, the corner fittings 150 in this embodiment are attached to the four corners of the display devices 11 just as were the corner fittings 30 and 50 in Embodiments 1 and 2 above.

Figure 21:
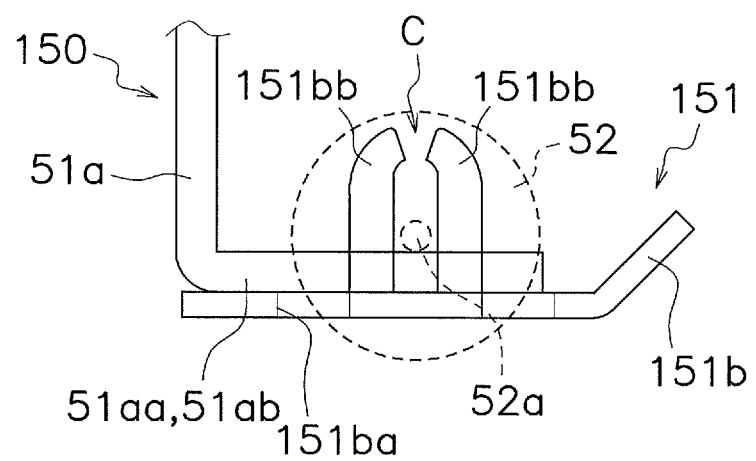
FIG. 21 is a side view of the configuration of the display device attachment fitting pertaining to another embodiment of the present disclosure.

As shown in FIG. 21, the corner fittings 150 each have a main body part 151 and a magnet 52.

As shown in FIG. 21, the main body part 151 is constituted by putting together flat members, and has a linking plate 51a and a planar part (first jig; planar part) 151b.

The linking plate 51a is a substantially triangular flat member, and has a pair of support components 51aa and 51ab that are disposed along a direction that is perpendicular to the plane of the linking plate 51a, from the two edges besides the bottom edge of the approximate triangular shape. The support components 51aa and 51ab are linked and integrated with the planar part 151b by using the bolts 53 (see FIG. 16A, etc.).

The planar part 151b is a substantially square flat member, and is linked by the bolts 53 (see FIG. 16A, etc.) to the support components 51aa and 51ab in a direction that is perpendicular to the linking plate 51a. Also, the planar part 151b has an opening 151ba in its center portion, and two axial support components 151bb at both ends in the lengthwise direction.

The circular columnar magnet 52 is attached on the inside of the opening 151ba so that the circular columnar outer peripheral face protrudes outward through the planar part 151b.

The two axial support components 51bb are attached so as to protrude from a face on the inside of the planar part 151b, and are put together to form a substantially U-shaped member. They support a shaft 52a that is provided at both ends in the axial direction of the magnet 52 (discussed below), at the open portion on the inside of the two axial support components 151bb. More specifically, the two axial support components 51bb support the shaft 52a at both ends of the magnet 52 in a state in which movement is possible in a direction that lies along the planar direction of the display screen 11a of the display device 11, that is, in a direction that is perpendicular to the plane of the planar part 151b.

Also, the two axial support components 151bb for a cut-out C in which the bottom part of the approximate U shape has been cut out.

The cut-out C is formed so that the smallest gap between the two axial support components 151bb is slightly smaller than the shaft 52a of the magnet 52. When the magnet 52 is attached to or removed from the corner fitting 150, the shaft 52a is pushed in or pulled out through the cut-out C, which allows the magnet 52 to be easily installed and removed.

The adjustment of the magnetic force of the magnet 52 that has been removed from the corner fitting 150 will now be described through reference to FIGS. 22A and 22B.

Figure 22A:
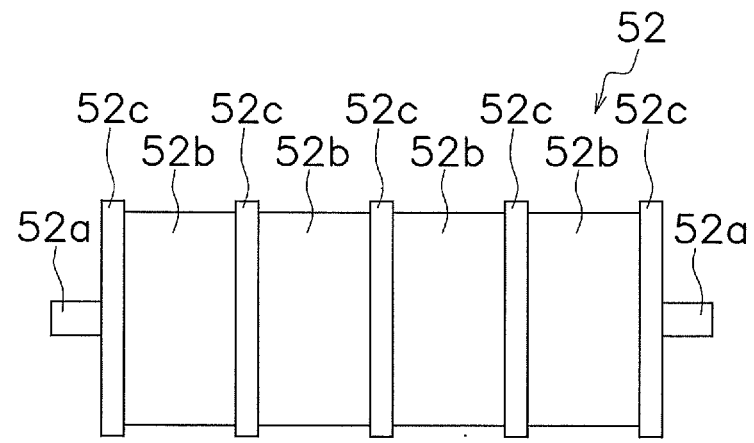
FIG. 22A is a diagram of the configuration of a magnet included in the display device attachment fitting in FIG. 21.

As shown in FIG. 22A, the magnet 52 has the shaft 52*a*, four magnet parts 52*b*, and five yoke plates 52*c*.

The shaft 52*a* is inserted into through-holes formed in the center portions of the four magnet parts 52*b* and the five yoke plates 52*c*.

The four magnet parts 52*b* are disposed one by one in between the five yoke plates 52*c*. That is, the magnet 52 is made up of alternating yoke plates 52*c* and magnet parts 52*b*.

The five yoke plates 52*c* are metal disk-shaped members, and are disposed between the magnet parts 52*b* and on the outside of the magnet parts 52*b* at both ends.

Figure 22B:
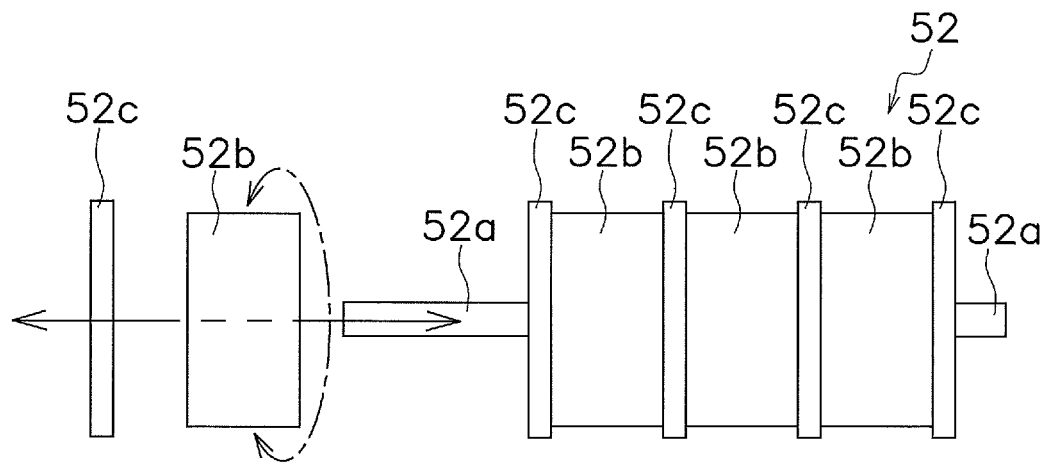
FIG. 22B shows the operation for taking apart the magnet in FIG. 22A and changing its orientation.

As shown in FIG. 22B, when the magnetic force of the magnet 52 is adjusted, the yoke plate 52*c* and the magnet part 52*b* at one end are removed form the shaft 52*a*, after which the orientation of the magnet part 52*b* is reversed, and it is reattached to the shaft 52*a*.

This weakens the magnetic force of the magnet 52 as compared to a configuration in which the north and south poles of the four magnet parts 52*b* are all facing in the same direction. That is, by setting the orientation of the magnet parts 52*b* to 1:3, 2:2, and 3:1, the magnetic force of the magnet 52 can be weakened as compared to a configuration of 0:4 or 4:0.

As a result, when a large screen is formed by putting together a plurality of display devices 11, the work entailed by positioning can be made easier by weakening the magnetic force of the magnet 52 in finely adjusting the positioning between adjacent display devices 11.

Other Embodiments

Embodiments of the present disclosure were described above, but the present disclosure is not limited to or by these embodiments, and various modifications are possible without departing from the gist of the disclosure.

(A)

In Embodiment 3 above, an example was given in which the magnetic force of the magnet 52 was adjusted by switching the orientation of the magnet parts 52*b* constituting the magnet 52 in order to facilitate fine adjustment in the positioning of adjacent display devices 11 when forming a large screen by putting together a plurality of display devices 11, but the present disclosure is not limited to this.

For example, in forming a large screen by putting together a plurality of display devices 11, a corner fitting 250 that allows the magnet 52 to be temporarily fixed may be used so that the magnet 52 is not unintentionally mated with its corresponding concave component 51*ca*.

Figure 23A:
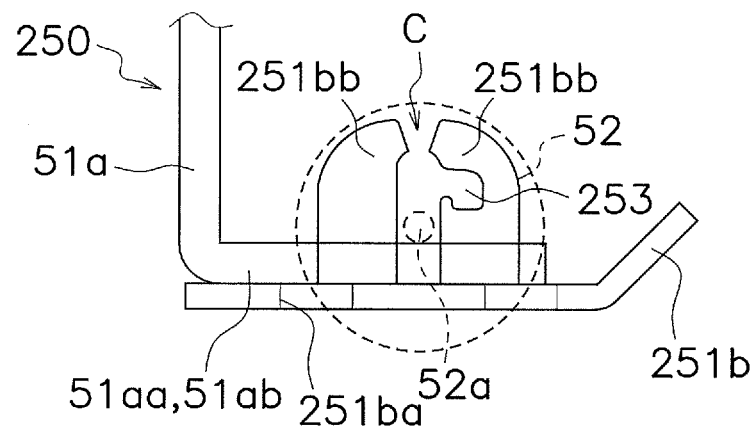
FIGS. 23A and 23B are side views of the configuration of the display device attachment fitting pertaining to yet another embodiment of the present disclosure.
Figure 23B:
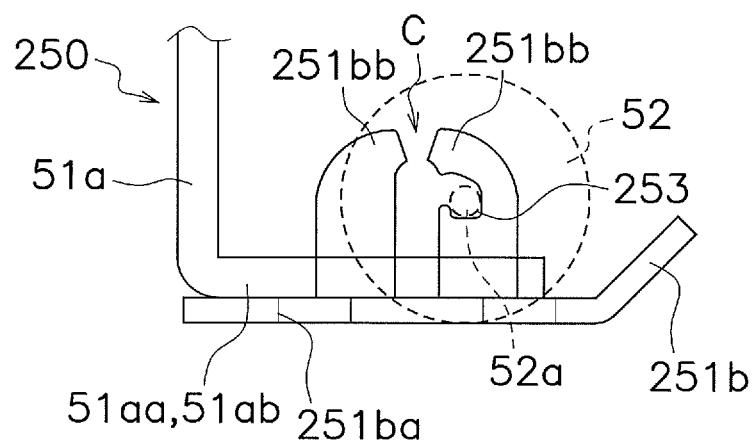

As shown in FIGS. 23A and 23B, the corner fitting 250 has two axial support components 251*bb*, and a cut-out C that is formed between the two axial support components 251*bb*.

A temporary fixing groove 253 for temporarily fixing the shaft 52*a* of the magnet 52 is formed in one of the two axial support components 251*bb*.

The corner fitting 250 in this embodiment is such that during work in which the magnet 52 may be mated with its corresponding concave component 51*ca*, as shown in FIG. 23A, the shaft 52*a* of the magnet 52 is able to move in the up and down direction in the drawing (a direction that intersects a planar part 251*b*).

Consequently, as shown in FIG. 23A, part of the outer peripheral face of the magnet 52 is able to protrude downward from the planar part 151*b*. Thus, in the state shown in FIG. 23A, the magnet 52 and its corresponding concave component 51*ca* are mated, and positioning is possible.

Meanwhile, during work in which it is undesirable for the magnet 52 and its corresponding concave component 51*ca* to mate, as shown in FIG. 23B, the shaft 52*a* of the magnet 52 is latched in the temporary fixing groove 253 of the axial support component 251*bb*.

Consequently, as shown in FIG. 23B, part of the outer peripheral face of the magnet 52 does not protrude downward from the planar part 151*b*. Thus, in the state shown in FIG. 23B, since the magnet 52 cannot mate with the corresponding concave component 51*ca*, this prevents a decrease in work efficiency that would happen if the magnet 52 and the concave component 51*ca* were mated against the intention of the worker.

A convex component 253*a* that keeps the shaft 52*a* of the magnet 52 from rolling out is formed on the open side of the temporary fixing groove 253 at the axial support component 251*bb*.

This prevents the shaft 52*a* that has been temporarily fixed in the temporary fixing groove 253 from falling and causing the magnet 52 to protrude to the outside from the face of the planar part 251.

The convex component 253*a* is not an essential component of the present disclosure, but providing it is preferable from the standpoint of securely holding the magnet 52 in its temporarily fixed position.

(B)

In the other embodiment (A) above, an example was given in which the temporary fixing groove 253 was provided to part of the axial support component 251*bb* to prevent the magnet 52 from mating in the corresponding concave component 51*ca* against the will of the worker, but the present disclosure is not limited to this.

Figure 24A:
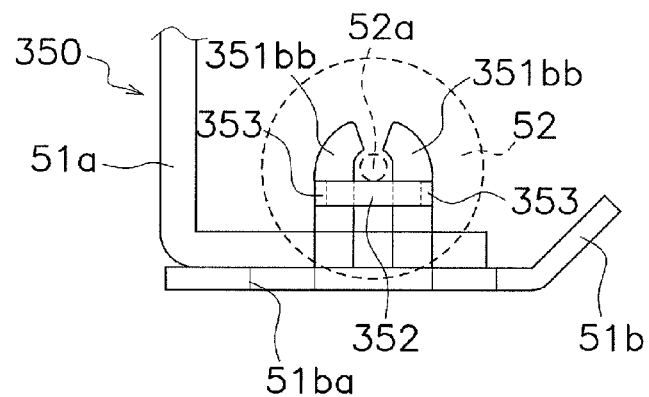
FIGS. 24A to 24C are side views of the configuration of the display device attachment fitting pertaining to yet another embodiment of the present disclosure.

For example, as shown in FIG. 24A, a corner fitting 350 provided with a stopper 352 may be used to restrict the movement of the shaft 52*a* of the magnet 52, which is able to move between axial support components 351*bb*.

Figure 24B:
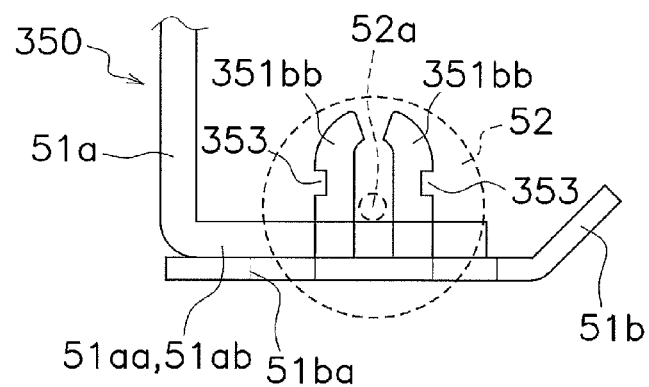
Figure 24C:
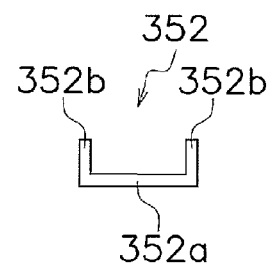

With this configuration, as shown in FIG. 24B, concave components 353 are formed on the outside of the two axial support components 351*bb*. Insertion components 352*b* of the stopper 352, which is substantially U-shaped as shown in FIG. 24C, mate with these concave components 353.

This allows the shaft 52*a* of the magnet 52 to be supported by the portion of a support component 352*a* on the distal end side of the substantially U-shaped stopper 352.

As a result, as shown in FIG. 24A, the magnet 52 is temporarily fixed at a position that is away from the planar part 51*b*, so this prevents the magnet 52 from being mated with the opposing concave component 51*ca* against the will of the worker.

(C)

In the above embodiments, an example was given in which a total of nine display units 10 (three rows and three columns) were put together to form a large screen, but the present disclosure is not limited to this.

For example, there may be two rows and two columns of display units 10, or four or more rows and four or more columns, thereby forming a smaller or larger screen.

(D)

In the above embodiments, an example was given in which the installation procedure in forming a large screen involved attaching the frame body 12*a* side of the attachment fitting 12 to the wall 15 first, and then attaching the fitting component 12*b* that has been fixed to the rear face 11*b* side of the display device 11, but the present disclosure is not limited to this.

For example, the procedure for fixing to the wall is not limited to what was described in the above embodiments, and may be suitably modified according to the shape of the attachment fitting, the size and importance of the display unit, and so forth.

(E)

In the above embodiments, an example was given in which the protrusion 32 and the engagement hole (concave component) 33 were provided to the planar parts 31*b* and 31*c* of a single corner fitting 30, but the present disclosure is not limited to this.

For example, the same positioning as above may be accomplished by separately forming a jig provided with a protrusion, and a jig provided with an engagement hole (concave component), and then putting these together.

Alternatively, the combination of the protrusion and the concave component may be accomplished using other shapes besides those described in the above embodiments.

Also, the combination of the protrusion and the engagement hole (concave component) may involve not just one of each at every corner, but a plurality of protrusions and engagement holes that are combined for positioning.

Furthermore, the engagement holes need not be through-holes and may instead be formed as recesses that are somewhat larger than the size of the protrusion in its height direction.

(F)

In the above embodiments, an example was given in which a large screen was formed by attaching display units 10 to which attachment fittings 12 had been mounted, to the wall 15, but the present disclosure is not limited to this.

For example, depending on where the large screen is installed, the display units may be attached not to a wall, but to scaffolding or another such framework.

Here again, even if the attachment face on the framework side is not very flat, the flatness of the display screens of the display devices can be ensured by coupling the attachment fittings together.

GENERAL INTERPRETATION OF TERMS

In understanding the scope of the present invention, the term "configured" as used herein to describe a component, section, or part of a device includes hardware and/or software that is constructed and/or programmed to carry out the desired function.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms "including," "having," and their derivatives. Also, the terms "part," "section," "portion," "member," or "element" when used in the singular can have the dual meaning of a single part or a plurality of parts.

Terms that are expressed as "means-plus function" in the claims should include any structure that can be utilized to carry out the function of that part of the present invention. Finally, terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

The invention claimed is:

1. A display device attachment jig that is used to form a large screen by arranging display devices in rows, the display device attachment jig comprising:
   a first jig and a second jig that are attached at mutually opposing positions at the ends of display devices disposed adjacent to one another,
   wherein the first jig has:
   a planar portion that is provided to the end of the display device and is disposed substantially perpendicular to a display screen of the display device;
   an open portion that is formed in the planar portion; and
   a magnet that is disposed in the open portion so that at least part protrudes from the planar portion toward the outside of the display device, that is able to move in a direction that intersects the planar portion, that is unable to move in a direction that is perpendicular to the display screen, and that adheres to metal, and
   the second jig has:
   a planar portion that is provided at a position opposite the first jig at the end of the display device, and is disposed substantially perpendicular to the display screen of the display device; and
   a concave part that is provided to the planar portion of the second jig, is recessed from the planar portion of the second jig toward the inside of the display device, and to which the magnet of the first jig is adhered.

2. The display device attachment jig according to claim 1, wherein an attraction component has a substantially circular columnar shape, and in a state of being disposed in the open portion, is disposed so that a side face of the substantially circular columnar shape sticks out from the planar portion of the first jig.

3. The display device attachment jig according to claim 1, wherein the first and second jigs are attached to four corners of the display device.

4. The display device attachment jig according to claim 3, wherein the first and second jigs are integrated.

5. The display device attachment jig according to claim 2, wherein the attraction component has:
   a plurality of magnets;
   a plurality of yoke plates disposed between the magnets; and
   a shaft that is inserted into through-holes that pass through the magnets and the yoke plates.

6. The display device attachment jig according to claim 5, wherein the magnets are attached in a state in which the orientation in which they are mounted to the shaft can be varied.

7. The display device attachment jig according to claim 2, further comprising a shaft support that supports the attraction component in a state in which the attraction component can move in a direction that intersects the planar portion of the first jig and cannot move in a direction that is perpendicular to the display screen.

8. The display device attachment jig according to claim 7, wherein the shaft support has a temporary fixing groove that supports the attraction component so that the attraction component is temporarily unable to move in the direction that intersects the planar portion of the first jig.

9. The display device attachment jig according to claim 7, further comprising a stopper that is mounted to the shaft support and that supports the attraction component so that the attraction component is temporarily unable to move in the direction that intersects the planar portion of the first jig.

10. The display device attachment jig according to claim 9, wherein the stopper is substantially U-shaped, and is mounted so that a distal end portion of the stopper mates with two concave components formed in the shaft support.

* * * * *